United States Patent
Schulz et al.

(10) Patent No.: US 9,013,336 B2
(45) Date of Patent: *Apr. 21, 2015

(54) SECURED KEYPAD DEVICES

(75) Inventors: Christian Eric Schulz, Rocklin, CA (US); Arnon Aviv, Herzlia (IL); Amihay Avital, Petach Tikwa (IL); Sergey Meron, Netanya (IL); Mehran Mirkazemi-Moud, Rocklin, CA (US); Dave Faoro, Newcastle, CA (US)

(73) Assignee: Verifone, Inc., San Jose, CA (US)

(*) Notice: Subject to any disclaimer, the term of this patent is extended or adjusted under 35 U.S.C. 154(b) by 1492 days.

This patent is subject to a terminal disclaimer.

(21) Appl. No.: 12/355,857

(22) Filed: Jan. 19, 2009

(65) Prior Publication Data

US 2009/0184850 A1 Jul. 23, 2009

Related U.S. Application Data

(60) Provisional application No. 61/011,993, filed on Jan. 22, 2008.

(51) Int. Cl.
| | |
|---|---|
| H03K 17/94 | (2006.01) |
| H03M 11/00 | (2006.01) |
| G06F 1/16 | (2006.01) |
| G06F 3/02 | (2006.01) |
| G06F 21/83 | (2013.01) |
| G06F 21/86 | (2013.01) |
| H04M 1/23 | (2006.01) |

(52) U.S. Cl.
CPC .......... *G06F 1/1658* (2013.01); *G06F 1/1626* (2013.01); *G06F 1/1684* (2013.01); *G06F 3/0219* (2013.01); *G06F 21/83* (2013.01); *G06F 21/86* (2013.01); *H04M 1/23* (2013.01)

(58) Field of Classification Search
CPC .......................................................... G08B 1/08
USPC .................................................... 341/20–23
See application file for complete search history.

(56) References Cited

U.S. PATENT DOCUMENTS

| 3,466,643 A | 9/1969 | Moorefield |
|---|---|---|
| 3,735,353 A | 5/1973 | Donovan et al. |

(Continued)

FOREIGN PATENT DOCUMENTS

| DE | 2241738 B | 8/1974 |
|---|---|---|
| DE | 60101096 T2 | 7/2004 |

(Continued)

OTHER PUBLICATIONS

An International Preliminary Report on Patentability dated Jul. 19, 2011, which issued during the prosecution of Applicant's PCT/IL2009/000724.

(Continued)

*Primary Examiner* — Amine Benlagsir
(74) *Attorney, Agent, or Firm* — Sughrue Mion, PLLC

(57) ABSTRACT

A data entry device including a housing including a top housing portion including key apertures, a plurality of data entry keys mounted in the housing to have data entry key depression travel paths in the housing, the plurality of data entry keys being associated with a substrate, which is disposed below the top housing portion and anti-tampering electrical conductors arranged between the top housing portion and the substrate thereby to prevent unauthorized access to the substrate.

5 Claims, 18 Drawing Sheets

(56) References Cited

U.S. PATENT DOCUMENTS

| | | |
|---|---|---|
| 4,486,637 A | 12/1984 | Chu et al. |
| 4,527,030 A | 7/1985 | Oelsch |
| 4,593,384 A * | 6/1986 | Kleijne .................. 365/228 |
| 4,749,368 A | 6/1988 | Mouissie |
| 4,807,284 A | 2/1989 | Kleijne et al. |
| 4,847,595 A | 7/1989 | Okamoto |
| 5,086,292 A | 2/1992 | Johnson et al. |
| 5,237,307 A | 8/1993 | Gritton |
| 5,239,664 A | 8/1993 | Verrier et al. |
| 5,353,350 A | 10/1994 | Unsworth et al. |
| 5,506,566 A | 4/1996 | Oldfield et al. |
| 5,586,042 A | 12/1996 | Pisau et al. |
| 5,675,319 A * | 10/1997 | Rivenberg et al. ............ 340/550 |
| 5,861,662 A | 1/1999 | Candelore |
| 5,877,547 A | 3/1999 | Rhelimi et al. |
| 5,998,858 A | 12/1999 | Little et al. |
| 6,288,640 B1 | 9/2001 | Gagnon |
| 6,359,338 B1 | 3/2002 | Takabayashi et al. |
| 6,396,400 B1 | 5/2002 | Epstein, III et al. |
| 6,414,884 B1 | 7/2002 | DeFelice et al. |
| 6,438,825 B1 | 8/2002 | Kuhn |
| 6,463,263 B1 | 10/2002 | Feilner et al. |
| 6,466,118 B1 | 10/2002 | Van Zeeland et al. |
| 6,633,241 B2 * | 10/2003 | Kaikuranta et al. ............ 341/33 |
| 6,646,565 B1 * | 11/2003 | Fu et al. .................. 340/687 |
| 6,830,182 B2 | 12/2004 | Izuyama et al. |
| 6,853,093 B2 | 2/2005 | Cohen et al. |
| 6,874,092 B1 | 3/2005 | Motoyama et al. |
| 6,912,280 B2 | 6/2005 | Henry |
| 6,917,299 B2 | 7/2005 | Fu et al. |
| 6,921,988 B2 | 7/2005 | Moree |
| 6,936,777 B1 | 8/2005 | Kawakubo |
| 7,170,409 B2 * | 1/2007 | Ehrensvard et al. ..... 340/539.26 |
| 7,270,275 B1 * | 9/2007 | Moreland et al. ............ 235/492 |
| 7,283,066 B2 | 10/2007 | Shipman |
| 7,497,378 B2 | 3/2009 | Aviv |
| 7,784,691 B2 | 8/2010 | Mirkazemi-Moud et al. |
| 7,843,339 B2 | 11/2010 | Kirmayer |
| 7,898,413 B2 * | 3/2011 | Hsu et al. .................. 340/571 |
| 2002/0002683 A1 | 1/2002 | Benson et al. |
| 2003/0025617 A1 * | 2/2003 | Kunigkeit et al. ............ 341/22 |
| 2004/0031673 A1 * | 2/2004 | Levy .................. 200/521 |
| 2004/0118670 A1 | 6/2004 | Park et al. |
| 2004/0120101 A1 * | 6/2004 | Cohen et al. ................. 361/654 |
| 2005/0081049 A1 | 4/2005 | Nakayama et al. |
| 2005/0184870 A1 * | 8/2005 | Galperin et al. ........... 340/568.2 |
| 2006/0049255 A1 | 3/2006 | von Mueller et al. |
| 2006/0049256 A1 | 3/2006 | von Mueller et al. |
| 2006/0192653 A1 | 8/2006 | Atkinson et al. |
| 2006/0201701 A1 | 9/2006 | Coleman et al. |
| 2007/0040674 A1 | 2/2007 | Hsu |
| 2007/0152042 A1 | 7/2007 | Mittler |
| 2007/0204173 A1 | 8/2007 | Kuhn |
| 2008/0180245 A1 | 7/2008 | Hsu et al. |
| 2008/0278353 A1 * | 11/2008 | Smith et al. .................. 341/22 |
| 2009/0058628 A1 | 3/2009 | Kirmayer |
| 2011/0063109 A1 | 3/2011 | Ostermöller |

FOREIGN PATENT DOCUMENTS

| | | |
|---|---|---|
| EP | 0375545 | 6/1990 |
| EP | 0375545 A1 | 6/1990 |
| EP | 1421549 | 5/2004 |
| EP | 1421549 A1 | 5/2004 |
| EP | 1432031 | 6/2004 |
| EP | 1432031 A1 | 6/2004 |
| EP | 1676182 | 7/2006 |
| EP | 1676182 A1 | 7/2006 |
| GB | 892198 | 3/1962 |
| GB | 1369739 | 10/1974 |
| GB | 2178235 | 2/1987 |
| GB | 2 353 401 A | 2/2001 |
| GB | 2372363 A | 8/2002 |
| GB | 2411756 A | 9/2006 |
| JP | 2002108711 | 4/2002 |
| WO | 01/63994 A2 | 8/2001 |
| WO | WO-2005086546 | 9/2005 |
| WO | 2010/082190 A1 | 7/2010 |

OTHER PUBLICATIONS

An Office Action dated Oct. 26, 2004, which issued during the prosecution of U.S. Appl. No. 10/326,726.

An Office Action dated May 28, 2004, which issued during the prosecution of U.S. Appl. No. 10/326,726.

An Office Action dated Apr. 10, 2012, which issued during the prosecution of U.S. Appl. No. 12/758,150.

An International Search Report and a Written Opinion both dated Apr. 30, 2012, which issued during the prosecution of Applicant's PCT/US2012/020142.

Van Ess, Dave; "Capacitive touch switches for automotive applications", http://www.automotivedesignline.com/, Feb. 2006.

Victor Kremin, et al., "Capacitive sensing—waterproof capacitance sensing", Cypress Perform, Dec. 2006.

An Office Action dated May 13, 2010, which issued during the prosecution of Applicant's U.S. Appl. No. 11/845,435.

A Notice of Allowance dated Sep. 10, 2010, which issued during the prosecution of Applicant's U.S. Appl. No. 11/845,435.

Supplementary European Search Report dated Oct. 31, 2013 which issued during the prosecution of Applicant's European App No. 07 86 9932.

* cited by examiner

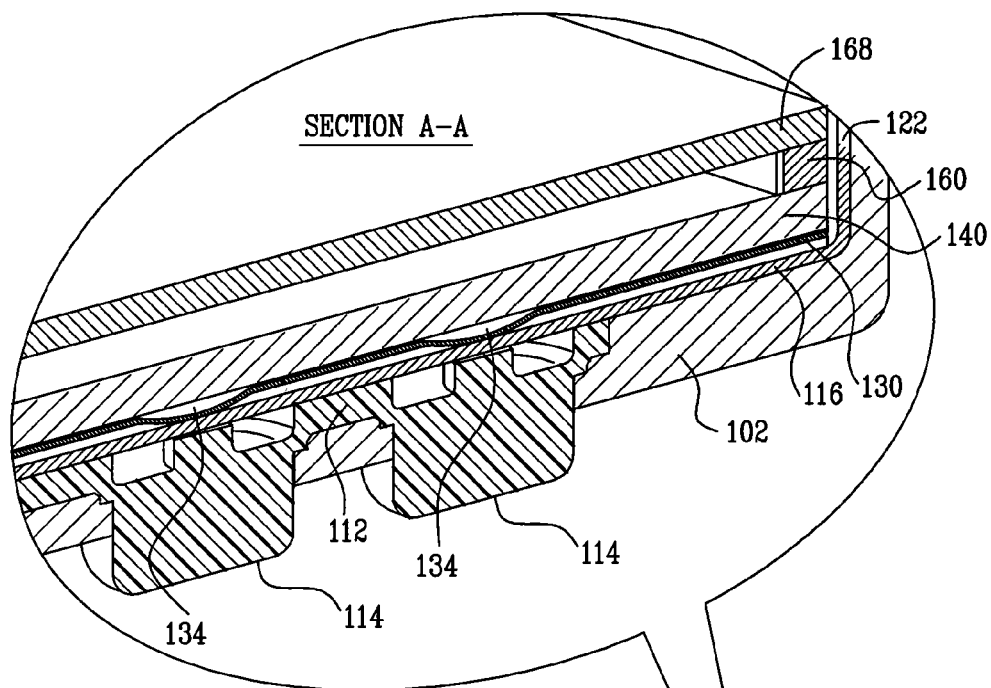
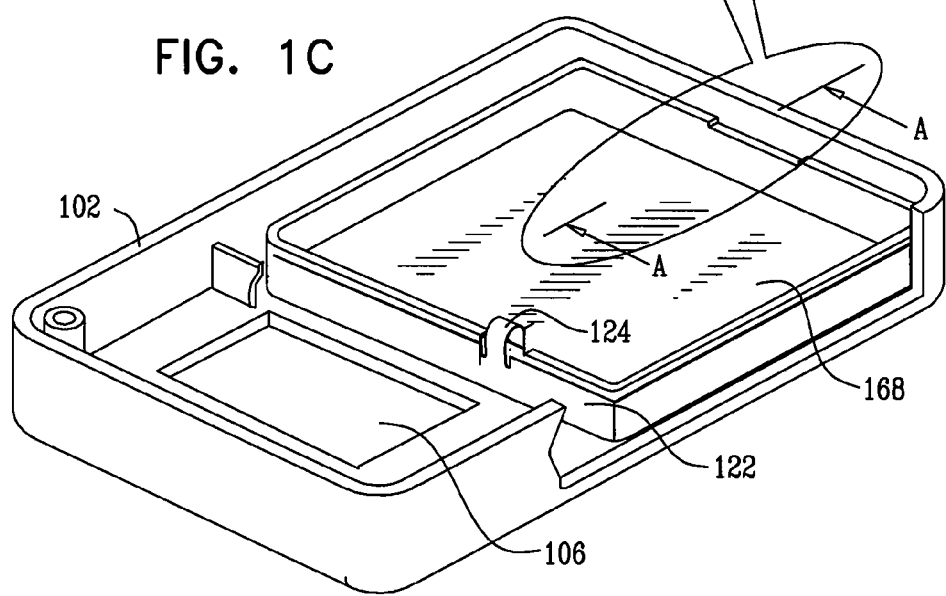
FIG. 1C

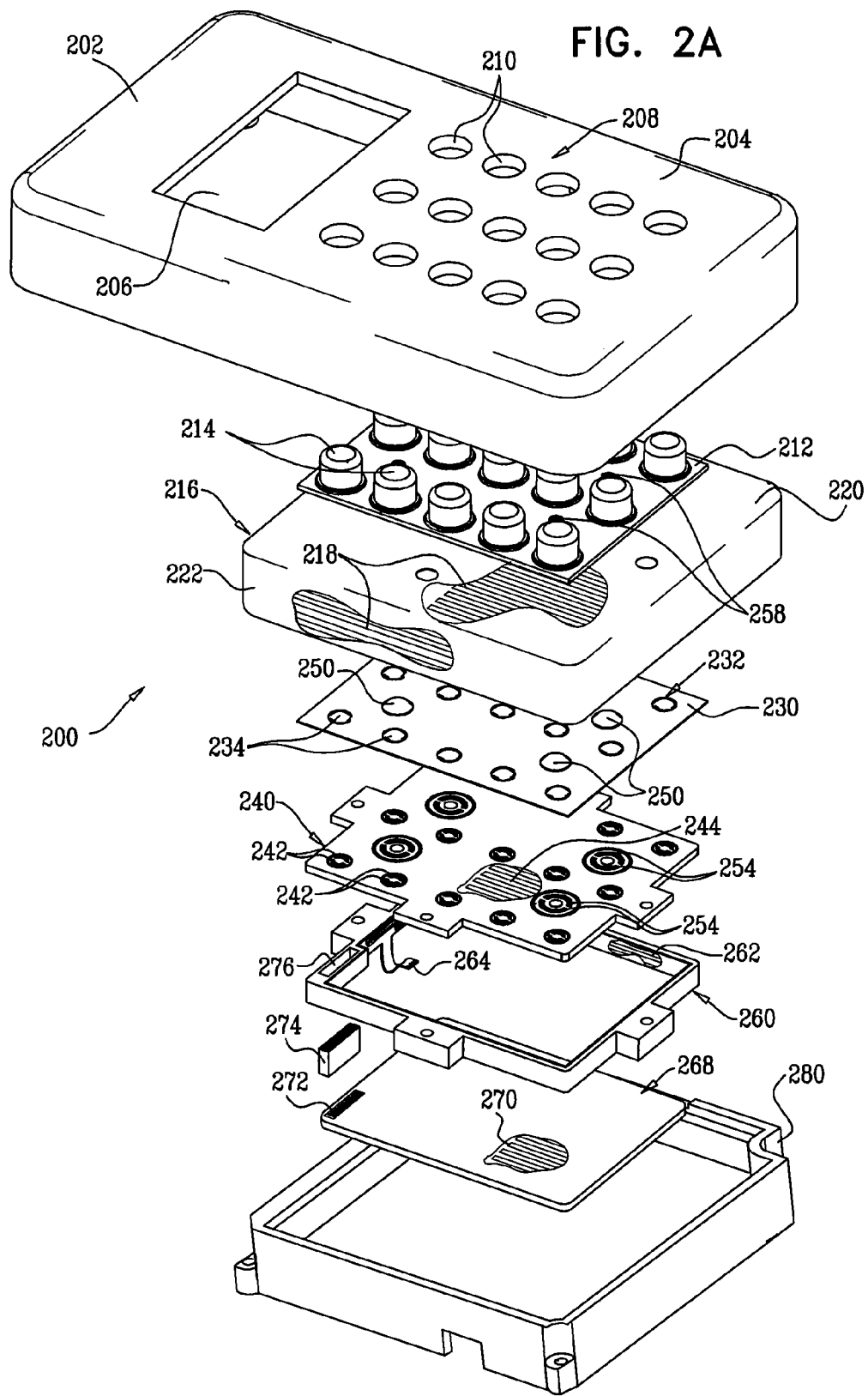

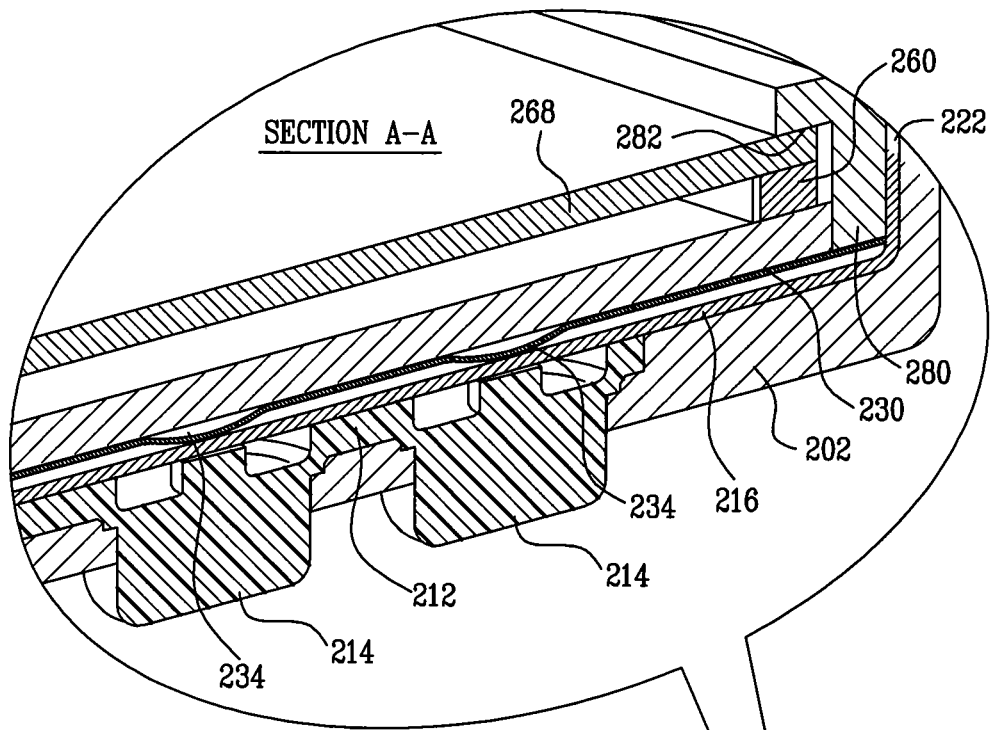
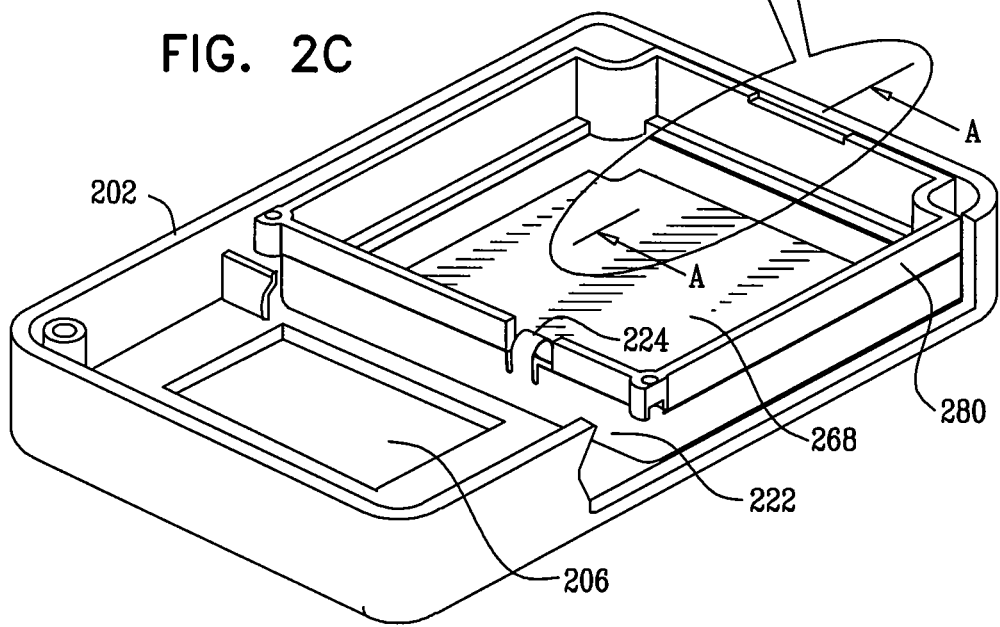
FIG. 2C

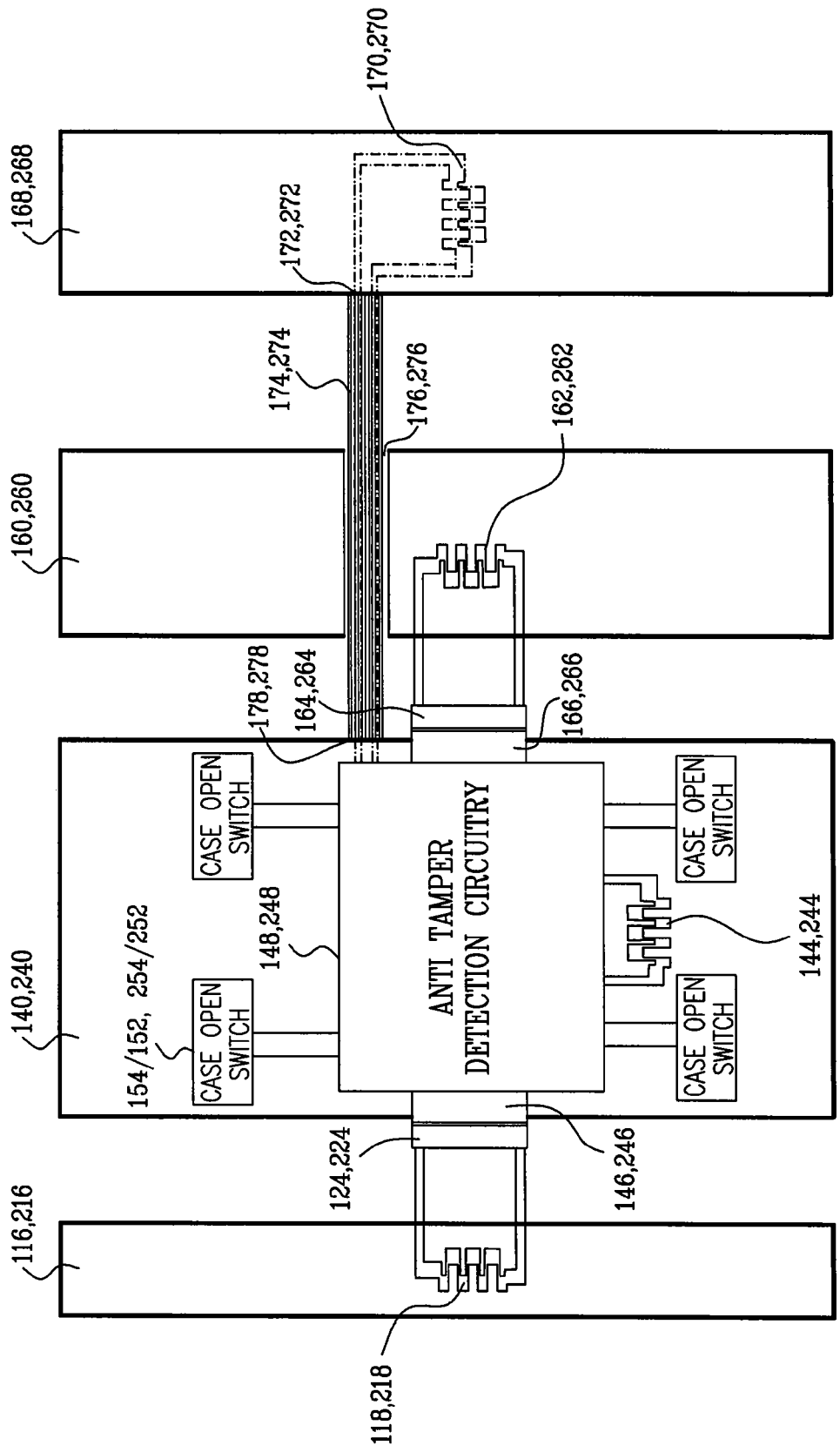

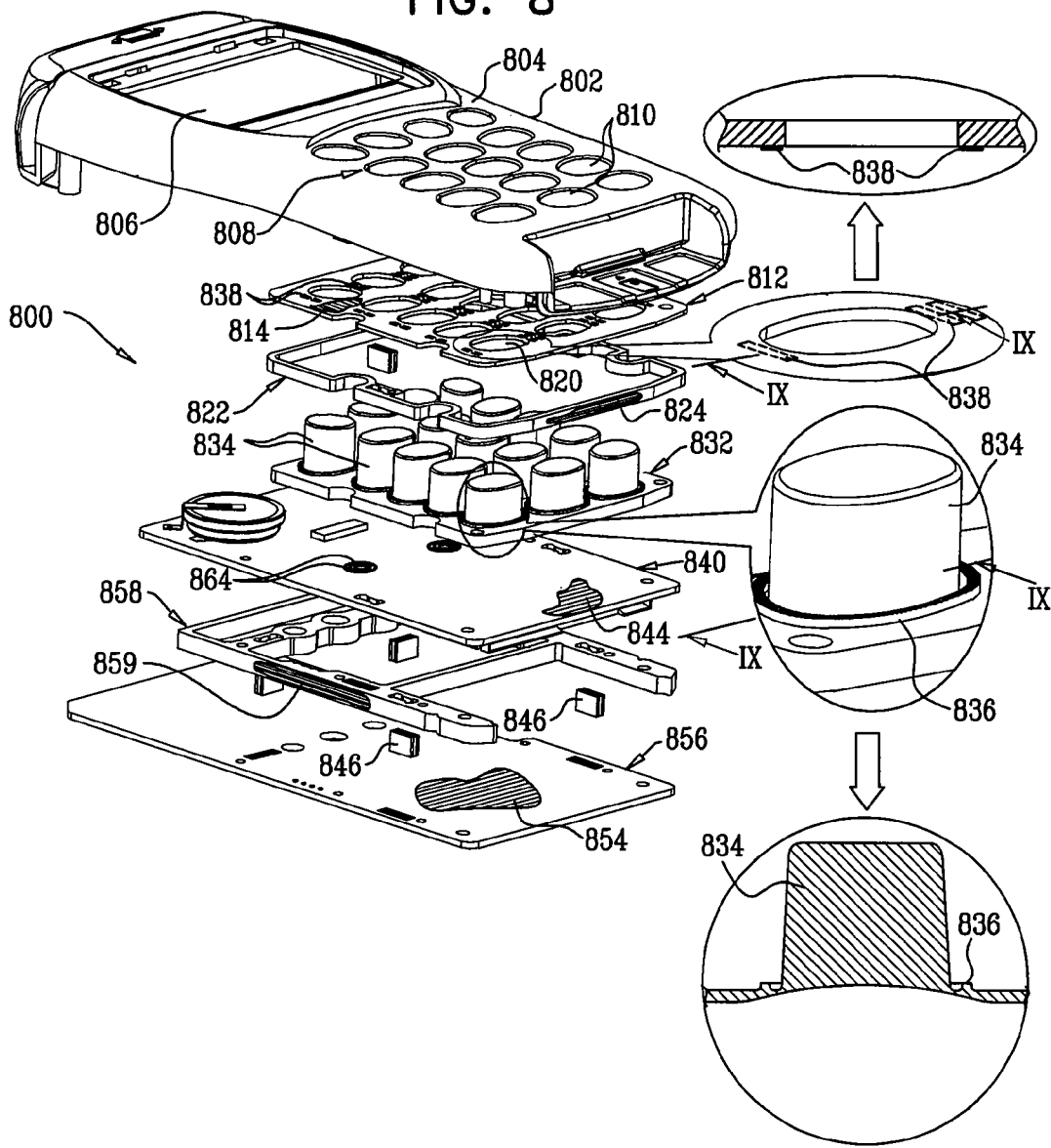
FIG. 8
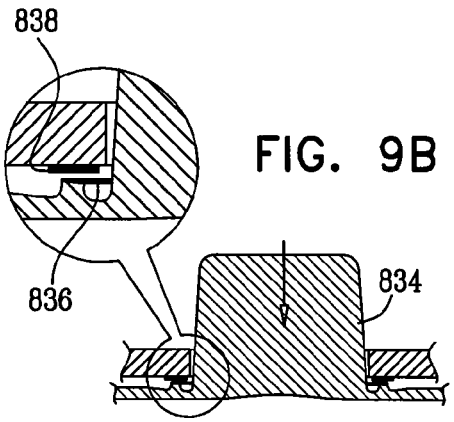
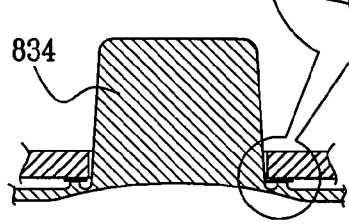
FIG. 9A    FIG. 9B

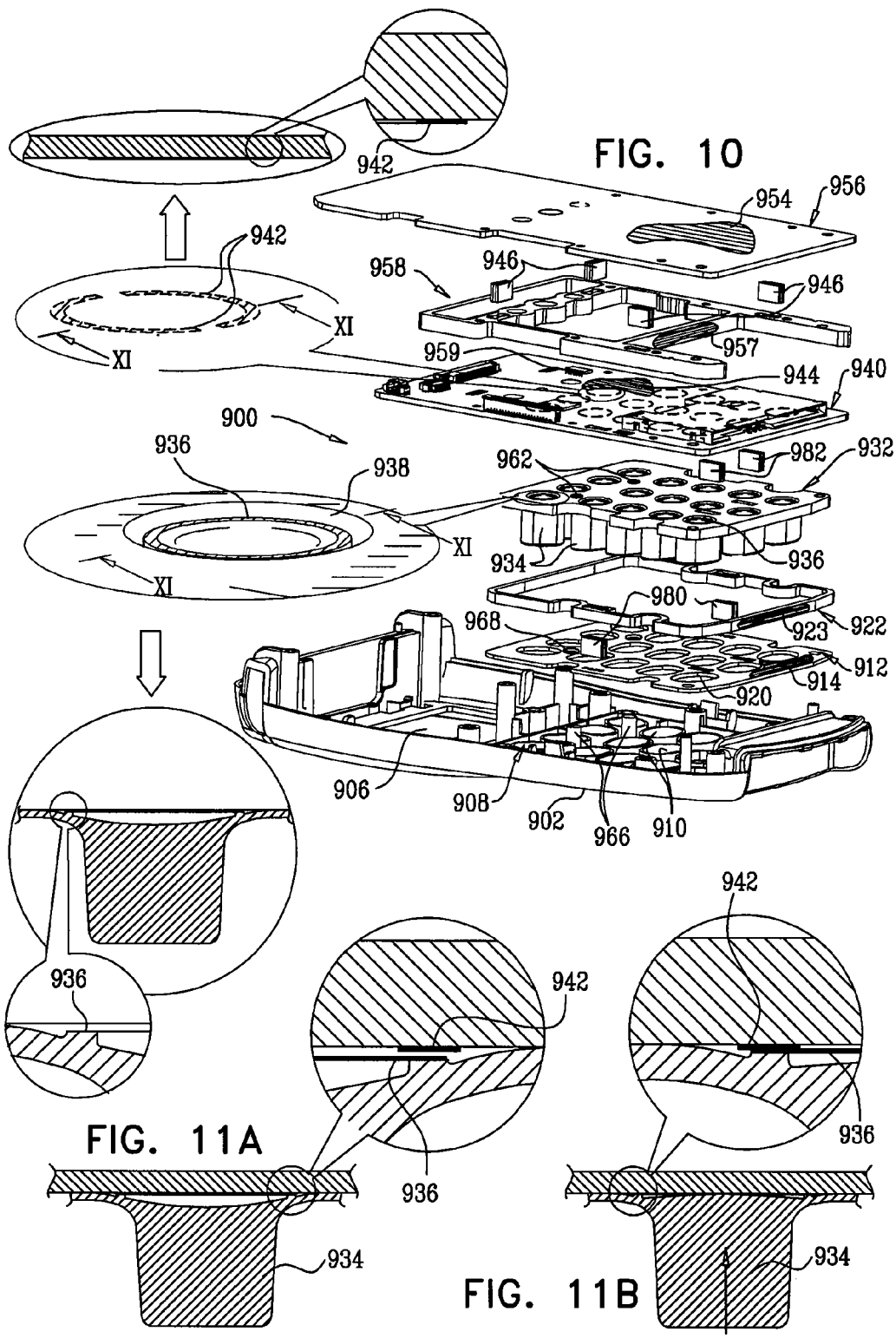

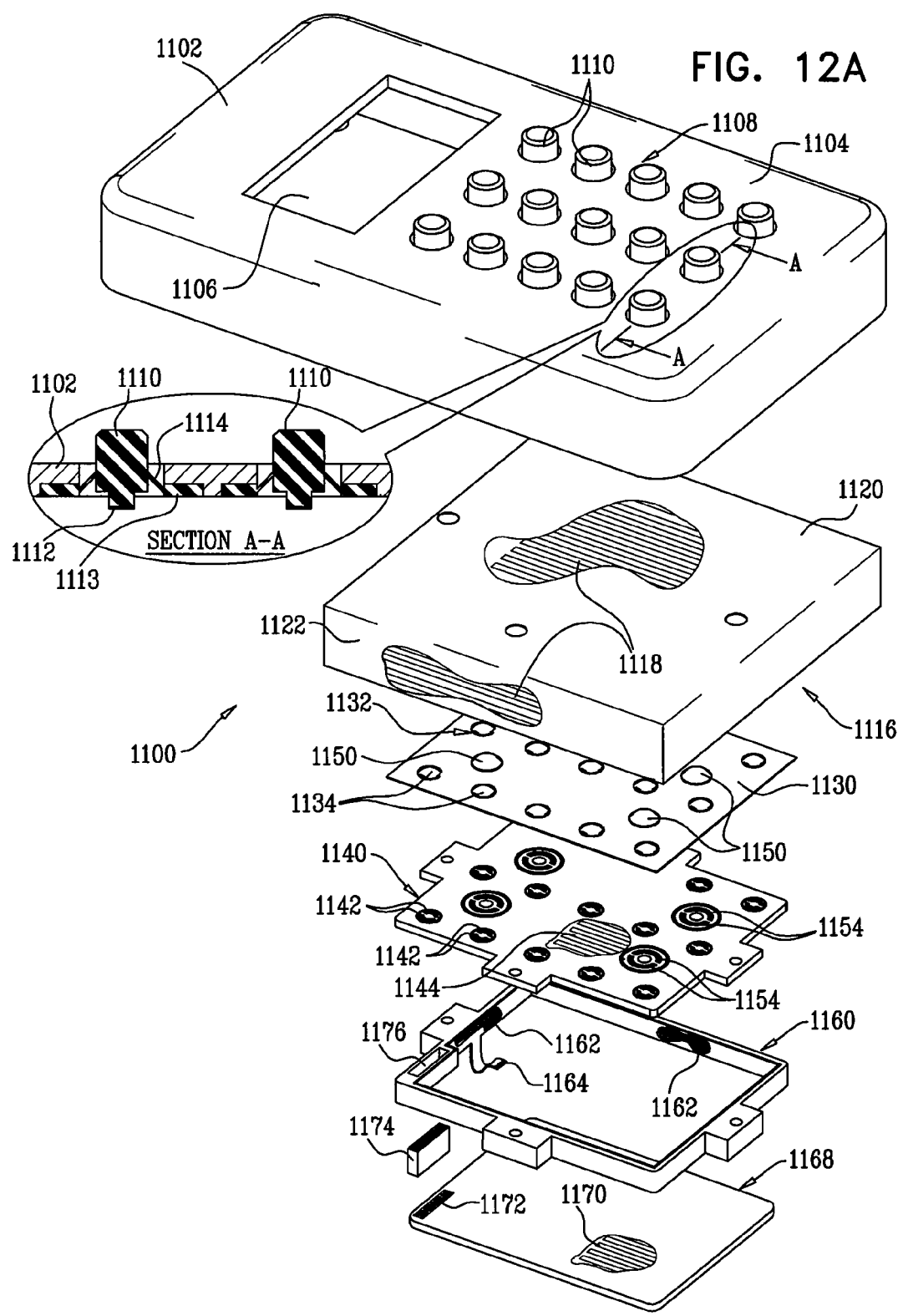

SECURED KEYPAD DEVICES

REFERENCE TO RELATED APPLICATIONS

Reference is made to U.S. Provisional Patent Application Ser. No. 61/011,993, filed Jan. 22, 2008 and entitled SECURED KEYPAD DEVICES, the disclosure of which is hereby incorporated by reference and priority of which is hereby claimed pursuant to 37 CFR 1.78(a) (4) and (5)(i).

Reference is also made to the following patent and patent application, owned by assignee, the disclosures of which are hereby incorporated by reference, which are believed to relate to subject matter similar to the subject matter of the present application:

U.S. Pat. No. 6,853,093 and U.S. Published Patent Application No. 2008/0135617.

FIELD OF THE INVENTION

The present invention relates generally to secure keypad devices and more particularly to data entry devices having anti-tamper functionality.

BACKGROUND OF THE INVENTION

The following U.S. Patent Publications are believed to represent the current state of the art and are hereby incorporated by reference:

U.S. Published Patent Application No. 2008/0278353;
U.S. Pat. Nos. 7,270,275; 6,646,565; 6,917,299 and 4,486,637;
European Patent Nos. 1421549 and 1676182; and
Great Britain Patent Application No. GB8608277.

SUMMARY OF THE INVENTION

The present invention seeks to provide improved secure keypad devices.

There is thus provided in accordance with a preferred embodiment of the present invention a data entry device including a housing including a top housing portion including key apertures, a plurality of data entry keys mounted in the housing to have data entry key depression travel paths in the housing, the plurality of data entry keys being associated with a substrate, which is disposed below the top housing portion; and anti-tampering electrical conductors arranged between the top housing portion and the substrate thereby to prevent unauthorized access to the substrate.

Preferably, the substrate is a flexible substrate. In accordance with a preferred embodiment of the present invention the anti-tampering electrical conductors are disposed peripherally of the substrate.

In accordance with a preferred embodiment of the present invention the data entry device also includes a plurality of key switch contacts mounted on the substrate and arranged to be displaced into or out of electrical contact with a corresponding plurality of electrical switches by depression of corresponding ones of the plurality of data entry keys to at least a predetermined extent along corresponding ones of the data entry key depression travel paths. Alternatively, the data entry device includes a plurality of key switch contacts mounted on the data entry keys and arranged to be displaced into or out of electrical contact with a corresponding plurality of electrical switches by depression of corresponding ones of the plurality of data entry keys to at least a predetermined extent along corresponding ones of the data entry key depression travel paths.

Preferably, the plurality of data entry keys are integrally formed with the substrate. In accordance with a preferred embodiment of the present invention the anti-tampering electrical conductors are electrically connected to anti-tampering detection circuitry.

Preferably, the anti-tampering electrical conductors are disposed above and below the substrate. Additionally, the anti-tampering electrical conductors above the flexible substrate and the anti-tampering electrical conductors below the flexible substrate are electrically connected to anti-tampering detection circuitry. Additionally or alternatively, the anti-tampering electrical conductors above the substrate are electrically connected to the anti-tampering electrical conductors below the substrate.

There is also provided in accordance with another preferred embodiment of the present invention a data entry device including a housing element, including a plurality of data entry keys disposed therein, the data entry keys having data entry key depression travel paths in the housing element, a plurality of key switch contacts mounted on a flexible substrate separate from the plurality of data entry keys and arranged to be displaced into or out of electrical contact with a corresponding plurality of electrical switches by depression of corresponding ones of the plurality of data entry keys to at least a predetermined extent along corresponding ones of the data entry key depression travel paths and anti-tampering electrical conductors arranged with respect to the plurality of key switch contacts thereby to prevent unauthorized electrical contact therewith.

Preferably, the anti-tampering electrical conductors are disposed above and below the flexible substrate. Additionally, the anti-tampering electrical conductors above the flexible substrate and the anti-tampering electrical conductors below the flexible substrate are electrically connected to anti-tampering detection circuitry. Alternatively or additionally, the anti-tampering electrical conductors above the substrate are electrically connected to the anti-tampering electrical conductors below the substrate.

In accordance with a preferred embodiment of the present invention the plurality of data entry keys are integrally formed with the housing element.

There is further provided in accordance with yet another preferred embodiment of the present invention data entry device including a housing element, including a plurality of data entry keys disposed therein, a plurality of housing-open indicating switch contacts and anti-tampering electrical conductors disposed effectively surrounding the plurality of housing-open indicating switch contacts thereby to prevent unauthorized electrical contact therewith.

In accordance with a preferred embodiment of the present invention the anti-tampering electrical conductors are electrically connected to anti-tampering detection circuitry.

Preferably, the plurality of data entry keys are integrally formed with the housing element.

BRIEF DESCRIPTION OF THE DRAWINGS

FIG. 1C is a simplified pictorial and sectional illustration of the assembled secure keypad device of FIGS. 1A and 1B;

FIGS. 2A and 2B are simplified exploded view illustrations, taken in respective opposite directions, of a secure keypad device constructed and operative in accordance with another preferred embodiment of the present invention;

FIG. 2C is a simplified pictorial and sectional illustration of the assembled secure keypad device of FIGS. 2A and 2B;

FIG. 3 is a simplified illustration of electrical connections between anti-tampering elements in the embodiments of FIGS. 1A-2C;

FIG. 8 is a simplified exploded view illustration of a secure keypad device constructed and operative in accordance with a still further preferred embodiment of the present invention;

FIGS. 9A and 9B are simplified sectional illustrations of part of the device of FIG. 8, taken along lines IX-IX in FIG. 8, in respective key non-depressed and key depressed operative orientations;

FIG. 10 is a simplified exploded view illustration of a secure keypad device constructed and operative in accordance with a yet further preferred embodiment of the present invention;

FIGS. 11A & 11B are simplified sectional illustrations of part of the device of FIG. 10, taken along lines XI-XI in FIG. 10, in respective key non-depressed and key depressed operative orientations; and FIGS. 12A and 12B are simplified exploded view illustrations, taken in respective opposite directions, of a secure keypad device constructed and operative in accordance with still another preferred embodiment of the present invention.

DETAILED DESCRIPTION OF PREFERRED EMBODIMENTS

Figure 1A:
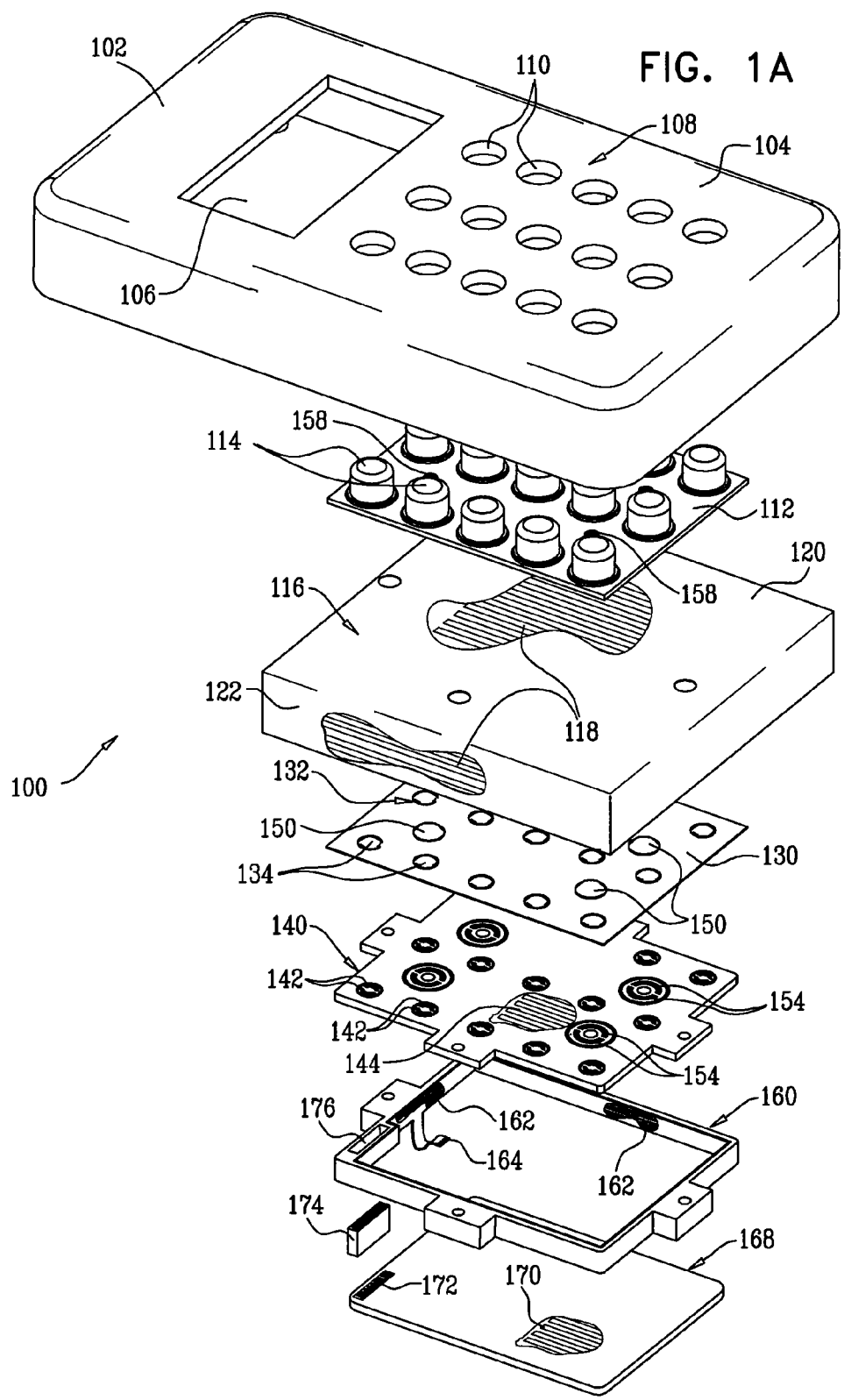
FIGS. 1A and 1B are simplified exploded view illustrations, taken in respective opposite directions, of a secure keypad device constructed and operative in accordance with a preferred embodiment of the present invention.
Figure 1B:
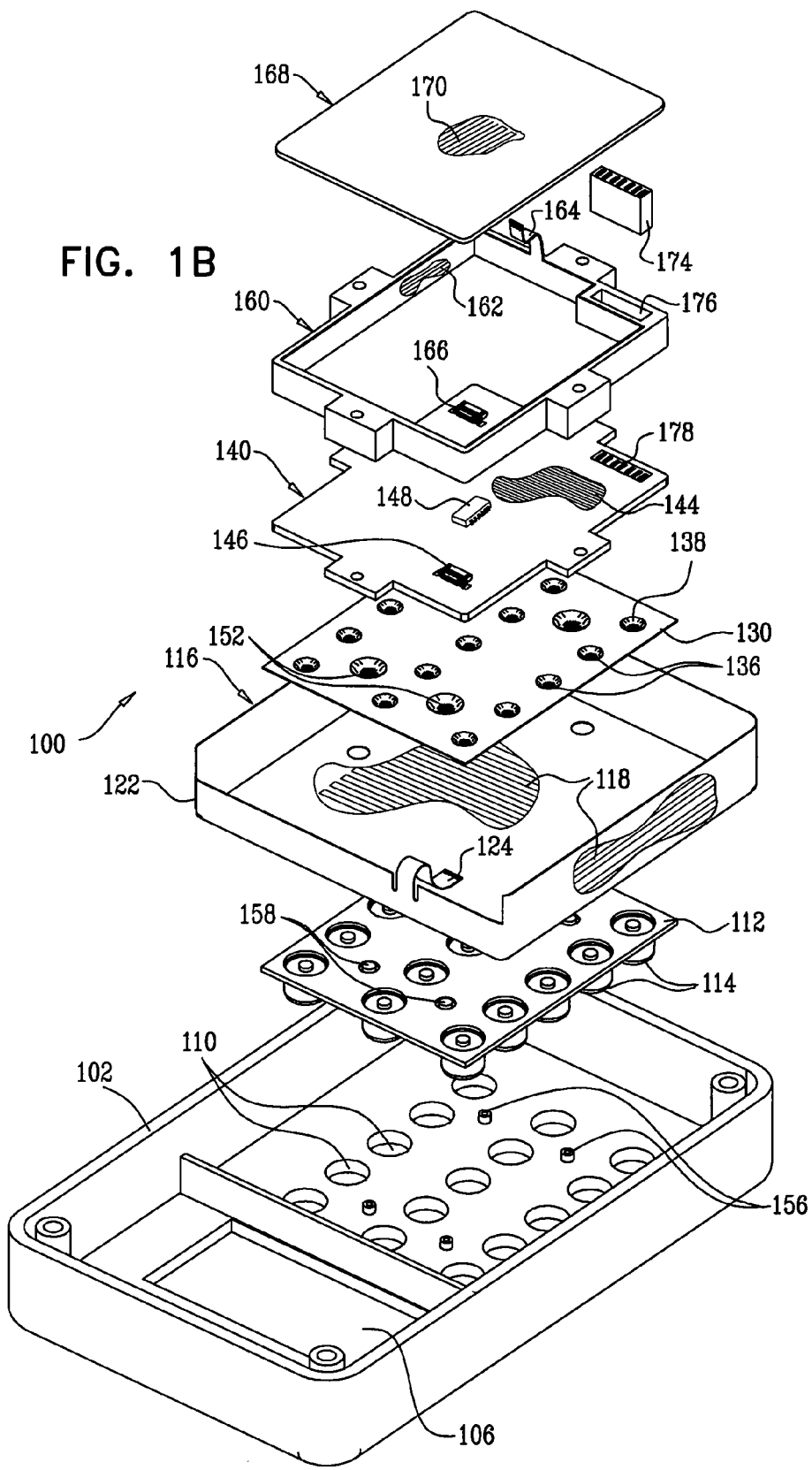

Reference is now made to FIGS. 1A, 1B and 1C, which illustrate a secure keypad device constructed and operative in accordance with a preferred embodiment of the present invention.

As seen in FIGS. 1A, 1B and 1C, there is provided a secure keypad device 100 including a housing element 102 which, together with a back panel (not shown), defines a keypad device housing. Housing element 102 includes, on a top surface 104 thereof, a display aperture 106, through which a display (not shown) may be viewed, and an array 108 of key apertures 110.

A key mat 112, preferably formed of a resilient plastic or rubber, defines a plurality of depressible keys 114, preferably integrally formed with mat 112, which partially extend through key apertures 110. A flexible resilient protective partial enclosure 116, which includes an anti-tampering grid 118, formed of a multiplicity of interconnected anti-tampering electrical conductors, on a top surface 120 thereof and on side surfaces 122 thereof, is provided. A flexible cable 124 is coupled to grid 118.

Disposed within protective partial enclosure 116, underlying top surface 120, is a key contact pad 130. Key contact pad 130 is preferably a resilient, generally planar, pad formed of flexible and resilient plastic or rubber, having an array 132 of raised resilient domes 134 with conductors 136 being formed on corresponding bottom facing surfaces 138 thereof.

Disposed in predetermined spaced relationship with key contact pad 130 is an electrical circuit board 140, which functions, inter alia, as a key contact board, defining a plurality of pairs of adjacent electrical contact pads 142, each pair underlying a corresponding conductor 136, preferably made of carbon, metal or combination of carbon/metal. The arrangement of key contact pad 130 and of electrical circuit board 140 is such that depression of a key 114 by the finger of a user causes conductor 136 to establish electrical contact with and between a corresponding pair of electrical contact pads 142 lying thereunder and in registration therewith. When key 114 is not depressed, no electrical contact exists between conductor 136 and a pair of corresponding electrical contact pads 142 or between the adjacent pads of the pair.

Electrical circuit board 140 preferably includes an anti-tampering grid 144 formed of a multiplicity of interconnected anti-tampering electrical conductors. An electrical connector 146 is arranged for mating connection with flexible cable 124. The anti-tampering grids 118 and 144 are coupled to anti-tampering detection circuitry 148.

In accordance with a preferred embodiment of the present invention, case-open switches, which sense physical tampering and opening of the housing, are also located within partial enclosure 116. In the illustrated embodiment, the case-open switches are each embodied in a raised resilient dome 150 formed on key contact pad 130 and have conductors 152 formed on an underside surface thereof. Domes 150 preferably extend outwardly from the surface of key contact pad 130 to a greater extent than do domes 134.

Disposed on electrical circuit board 140 underlying each of domes 150 are a corresponding number of pairs of adjacent electrical contact pads 154, each pair underlying a corresponding conductor 152. The arrangement of key contact pad 130 and of electrical circuit board 140 is such that as long as the housing is closed, conductors 152 each are in electrical contact with and between a corresponding pair of electrical contact pads 154 lying thereunder and in registration therewith. This electrical contact is ensured by the provision of pins 156 integrally formed on housing element 102. When the housing is closed, pins 156 urge corresponding domes 158 in key mat 112 towards partial enclosure 116 and urge partial enclosure 116 and thus corresponding domes 150 and conductors 152, on the underside surfaces thereof, into electrical contact with corresponding electrical contact pads 154.

When the housing is opened, no electrical contact exists between conductor 152 and corresponding pairs of electrical contact pads 154 or between the adjacent pads of the pair of electrical contact pads 154 and a suitable alarm or disablement occurs.

Disposed below electrical circuit board 140, there is provided a peripheral protective grid element 160 which includes an anti-tampering grid 162, preferably coupled to a flexible cable 164, which is in turn connected to a connector 166 on electrical circuit board 140. Peripheral protective grid element 160 preferably is located interiorly of the side surfaces 122 of enclosure 116. Fixedly attached to peripheral protective grid element 160 and preferably disposed therebelow is a bottom protective grid element 168 which includes an anti-tampering grid 170, which is coupled via contacts 172 and via a connector 174 which extends through an aperture 176 formed in peripheral grid element 160 into electrical contact with contacts 178 on electrical circuit board 140. The anti-tampering grids 162 and 170 are coupled to anti-tampering detection circuitry 148.

Figure 2B:
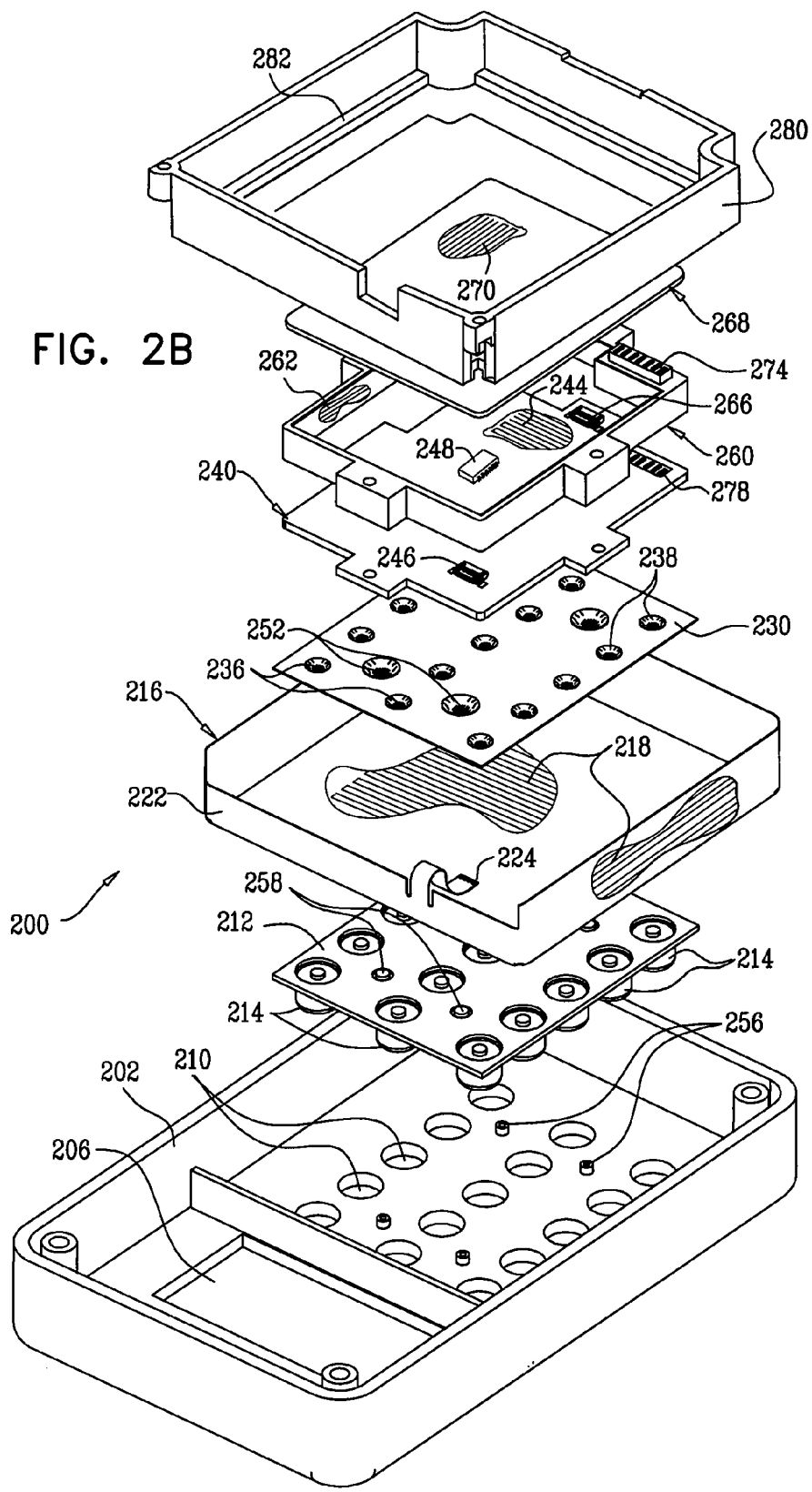

Reference is now made to FIGS. 2A, 2B and 2C, which illustrate a secure keypad device constructed and operative in accordance with another preferred embodiment of the present invention.

As seen in FIGS. 2A-2C, there is provided a secure keypad device 200 including a housing element 202 which, together with a back panel (not shown), defines a keypad device housing. Housing element 202 includes, on a top surface 204 thereof, a display aperture 206, through which a display (not shown) may be viewed, and an array 208 of key apertures 210.

A key mat 212, preferably formed of a resilient plastic or rubber, defines a plurality of depressible keys 214, preferably integrally formed with mat 212, which partially extend through key apertures 210. A flexible resilient protective partial enclosure 216, which includes an anti-tampering grid 218, formed of a multiplicity of interconnected anti-tampering electrical conductors, on a top surface 220 thereof and on side surfaces 222 thereof, is provided. A flexible cable 224 is coupled to grid 218.

Disposed within protective partial enclosure 216, underlying top surface 220, is a key contact pad 230. Key contact pad 230 is preferably a resilient, generally planar, pad formed of flexible and resilient plastic or rubber, having an array 232 of raised resilient domes 234 having conductors 236 formed on corresponding bottom facing surfaces 238 thereof.

Disposed in predetermined spaced relationship with key contact pad 230 is a electrical circuit board 240, which functions, inter alia, as a key contact board, defining a plurality of pairs of adjacent electrical contact pads 242, each pair underlying a corresponding conductor 236. The arrangement of key contact pad 230 and of electrical circuit board 240 is such that depression of a key 214 by the finger of a user causes conductor 236 to establish electrical contact with and between a corresponding pair of electrical contact pads 242 lying thereunder and in registration therewith. When key 214 is not depressed, no electrical contact exists between conductor 236 and a pair of corresponding electrical contact pads 242 or between the adjacent pads of the pair.

Electrical circuit board 240 preferably includes an anti-tampering grid 244 formed of a multiplicity of interconnected anti-tampering electrical conductors. An electrical connector 246 is arranged for mating connection with flexible cable 224. The anti-tampering grids 218 and 214 are coupled to anti-tampering detection circuitry 248.

In accordance with a preferred embodiment of the present invention, case-open switches, which sense physical tampering and opening of the housing, are also located within partial enclosure 216. In the illustrated embodiment the case-open switches are each embodied in a raised resilient dome 250 formed on key contact pad 230 and have conductors 252 formed on an underside surface thereof. Domes 250 preferably extend outwardly from the surface of key contact pad 230 to a greater extent than do domes 234.

Disposed on electrical circuit board 240 underlying each of domes 250 are a corresponding number of pairs of adjacent electrical contact pads 254, each pair underlying a corresponding conductor 252. The arrangement of key contact pad 230 and of electrical circuit board 240 is such that as long as the housing is closed, conductors 252 each are in electrical contact with and between a corresponding pair of electrical contact pads 254 lying thereunder and in registration therewith. This electrical contact is ensured by the provision of pins 256 integrally formed on housing element 202. When the housing is closed, pins 256 urge corresponding domes 258 in key mat 212 towards partial enclosure 216 and urge partial enclosure 216 and thus corresponding domes 250 and the conductors 252, on the underside surfaces thereof, into electrical contact with corresponding electrical contact pads 254.

When the housing is opened, no electrical contact exists between conductor 252 and corresponding pairs of electrical contact pads 254 or between the adjacent pads of the pair of electrical contact pads 254 and a suitable alarm or disablement occurs.

Disposed below electrical circuit board 240, there is provided a peripheral protective grid element 260 which includes an anti-tampering grid 262, preferably coupled to a flexible cable 264, which is in turn connected to a connector 266 on electrical circuit board 240. Peripheral protective grid element 260 preferably is located interiorly of the side surfaces 222 of enclosure 216. Fixedly attached to peripheral protective grid element 260, and preferably disposed therebelow, is a bottom protective grid element 268 which includes an anti-tampering grid 270, which is coupled via contacts 272 and via a connector 274, which extends through an aperture 276 formed in peripheral grid element 260, into electrical contact with contacts 278 on electrical circuit board 240. The anti-tampering grids 262 and 270 are coupled to anti-tampering detection circuitry 248.

In the illustrated embodiment of FIGS. 2A, 2B and 2C, there is also provided a structural peripheral enclosure element 280 which is disposed interiorly of the sides 222 of the flexible resilient protective partial enclosure 216 and which provides a peripheral seating surface 282 for electrical circuit board 240.

Reference is now made to FIG. 3, which is a generalized illustration of the electrical connections described hereinabove and includes reference numerals corresponding to both of the above-described embodiments shown respectively in FIGS. 1A-1C and 2A-2C. It may be appreciated from FIG. 3 that all of the anti-tampering grids are connected to the anti-tampering circuitry which is located within the protective enclosure.

Figure 4A:
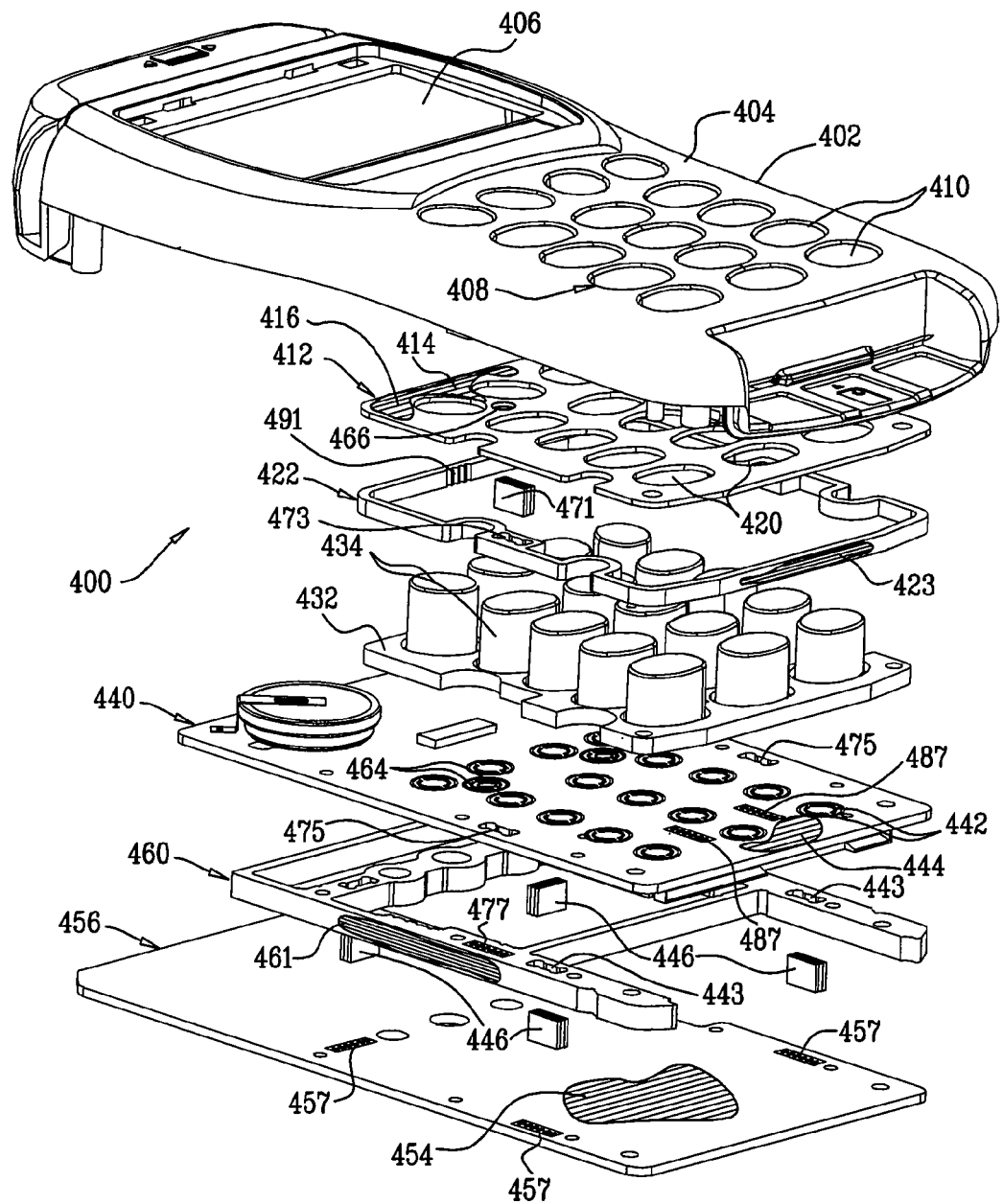
FIGS. 4A and 4B are simplified exploded view illustrations, taken in respective opposite directions, of a secure keypad device constructed and operative in accordance with a further preferred embodiment of the present invention.
Figure 4B:
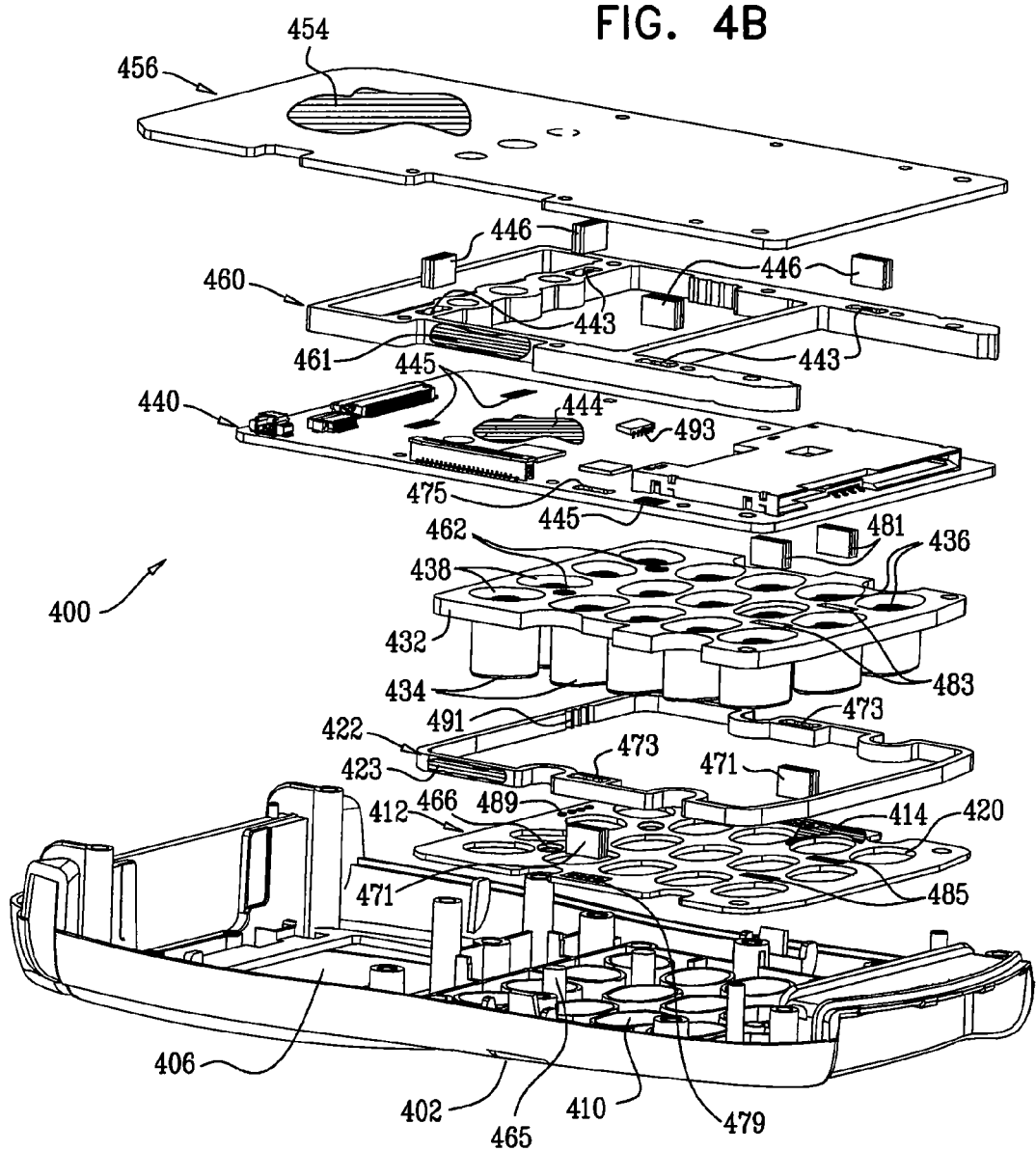
Figure 4C:
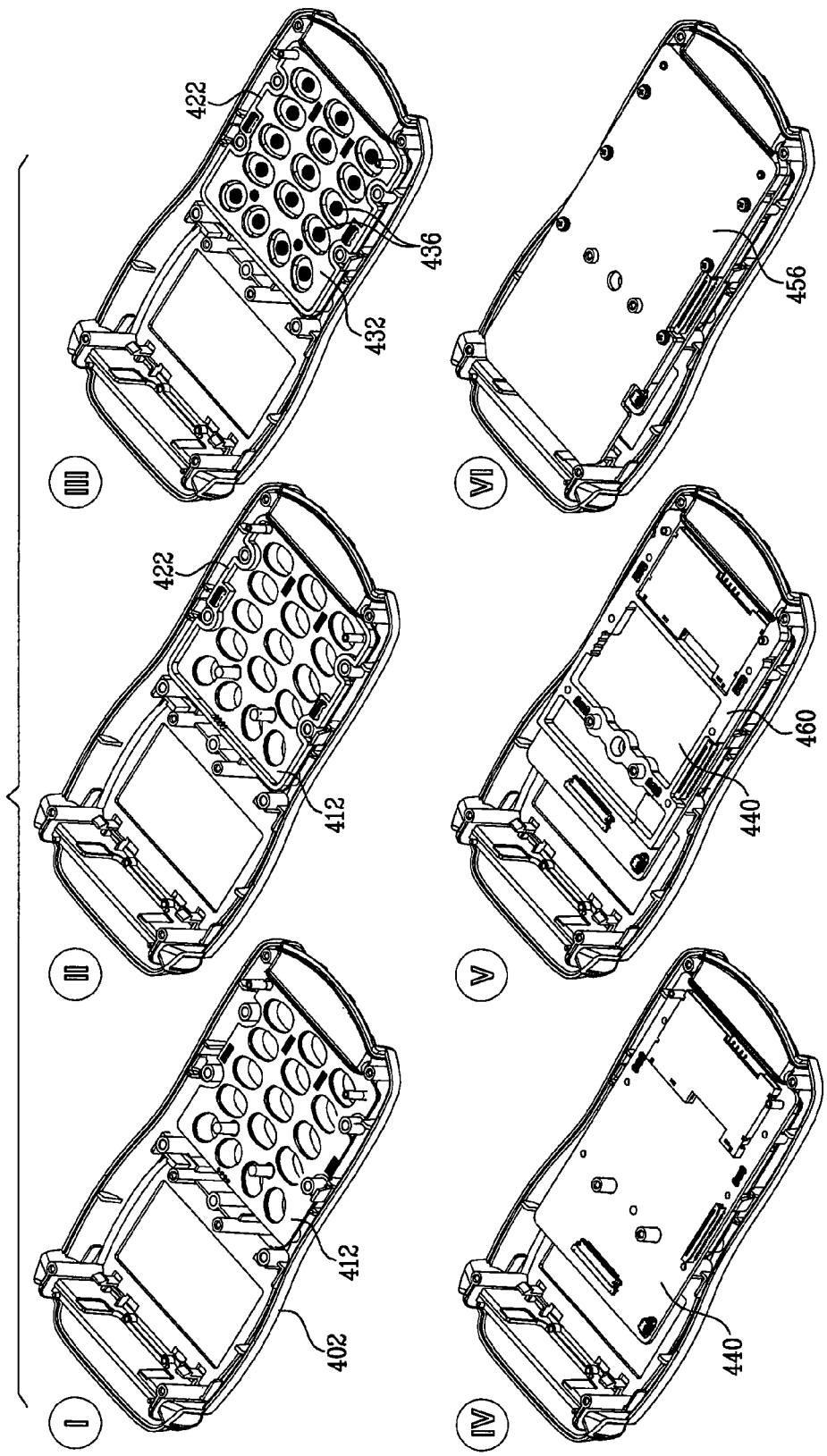
FIG. 4C is a simplified illustration the secure keypad device of FIGS. 4A and 4B at various levels of disassembly.
Figure 5:
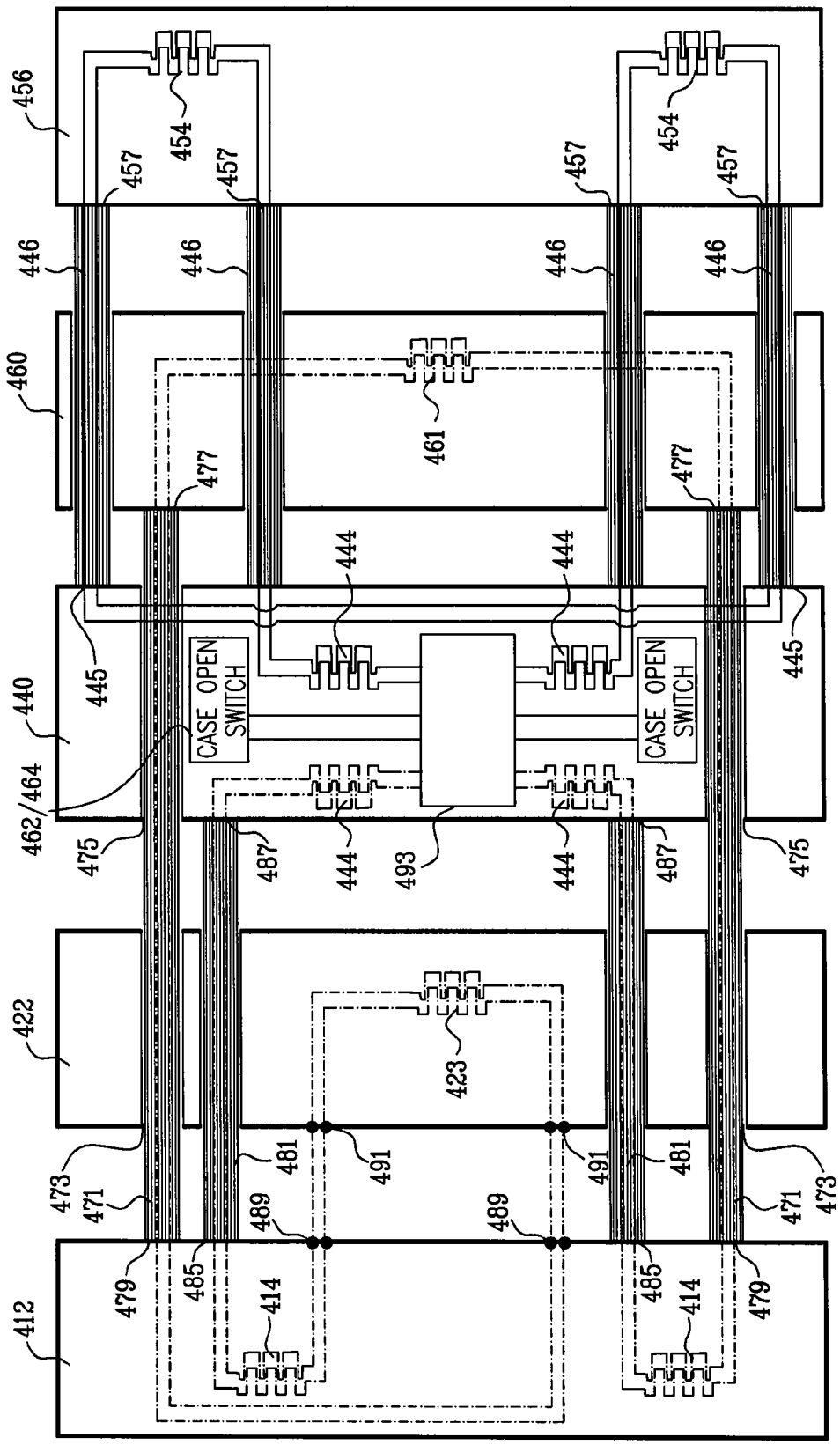
FIG. 5 is a simplified illustration of electrical connections between anti-tampering elements in the embodiments of FIGS. 4A-4C.

Reference is now made to FIGS. 4A and 4B, which are simplified exploded view illustrations, taken in respective opposite directions, of a secure keypad device constructed and operative in accordance with a further preferred embodiment of the present invention, to FIG. 4C, which is a simplified illustration the secure keypad device of FIGS. 4A and 4B at various stages of disassembly, and to FIG. 5, which is a simplified illustration of electrical connections between anti-tampering elements in the embodiments of FIGS. 4A-4C. FIG. 4C is provided to better illustrate the various elements of the keypad device of FIGS. 4A and 4B.

As seen in FIGS. 4A-5, there is provided a secure keypad device 400 including a housing element 402 which, together with a back panel (not shown), defines a keypad device housing. Housing element 402 includes, on a top surface 404 thereof, a display aperture 406, through which a display (not shown) may be viewed, and an array 408 of key apertures 410.

An anti-tamper board 412, which includes an anti-tampering grid 414 formed of a multiplicity of interconnected anti-tampering electrical conductors 416, underlies top surface 404 and is provided with key apertures 420 in registration with key apertures 410. Fixedly and electrically coupled to anti-tamper board 412 is a peripheral anti-tamper keypad enclosure 422, which preferably includes an anti-tampering grid 423 formed of a multiplicity of interconnected anti-tampering electrical conductors.

A key mat 432, preferably formed of a resilient plastic or rubber, defines a plurality of depressible keys 434, preferably integrally formed with mat 432, which partially extend through key apertures 410 and 420 and have conductors 436 formed on corresponding bottom facing surfaces 438 thereof.

An electrical circuit board 440, which functions, inter alia, as a key contact board, is disposed in predetermined spaced relationship with key mat 432 and defines a plurality of pairs of adjacent electrical contact pads 442, each pair underlying a corresponding conductor 436. The arrangement of key mat 432 and of electrical circuit board 440 is such that depression of a key 434 by the finger of a user causes conductor 436 to establish electrical contact with and between a corresponding pair of electrical contact pads 442 lying thereunder and in registration therewith. When key 434 is not depressed, no electrical contact exists between conductor 436 and a pair of corresponding electrical contact pads 442 or between the adjacent pads of the pair.

Circuit board 440 preferably includes an anti-tampering grid 444 formed of a multiplicity of interconnected anti-tampering electrical conductors. Fixedly coupled to circuit board 440 and an additional electrical circuit board 456 is a peripheral anti-tamper enclosure 460 which preferably includes an anti-tampering grid 461 formed of a multiplicity of interconnected anti-tampering electrical conductors.

Electrical connectors 446, which extend through apertures 443 formed in peripheral anti-tamper enclosure 460, are coupled via contacts 445 to grid 444 and arranged for mating connection through contacts 457 with an anti-tampering grid 454, formed of a multiplicity of interconnected anti-tampering electrical conductors, which is formed on additional electrical circuit board 456.

Electrical connectors 471 extend through apertures 473 formed in peripheral anti-tamper keypad enclosure 422 and through apertures 475 formed in circuit board 440, each underlying corresponding aperture 473. Electrical connectors 471 are coupled via contacts 477 to anti-tampering grid 461 and arranged for mating connection through contacts 479 with anti-tampering grid 414.

Electrical connectors 481, which extend through apertures 483 formed in keymat 432, are coupled via contacts 485 to anti-tampering grid 414 and arranged for mating connection through contacts 487 with anti-tampering grid 444.

Anti-tampering grid 423 is soldered via soldering points 489 on board 422 and soldering points 491 on board 412 to anti-tampering grid 414.

It is thus appreciated that the anti tampering grids 444, 414, 454, 423 and 461 on boards 440, 412 and 456 and enclosures 422 and 460, respectively, are interconnected so as to define an anti-tampering enclosure, which is coupled to and physically encloses anti-tampering detection circuitry 493.

It is appreciated that the anti-tampering grids can be interconnected in numerous ways using various types of connectors.

In accordance with a preferred embodiment of the present invention, case-open switches, which sense physical tampering and opening of the housing, are also located within the anti-tampering enclosure. In the illustrated embodiment, the case-open switches are each embodied in conductors 462 mounted on key mat 432 and corresponding pair of electrical contact pads 464 mounted on board 440. When the housing is closed, pins 465, which extend through apertures 466 in board 412, force conductors 462 and corresponding pair of electrical contact pads 464 into electrical contact or between the adjacent pads of the pair. When the housing is opened, pins 465 no longer force conductors 462 and corresponding pair of electrical contact pads 464 into electrical contact and as a result electrical contact no longer exists between conductors 462 and corresponding pair of electrical contact pads 464 or between the adjacent pads of the pair and a suitable alarm or disablement occurs.

Figure 6A:
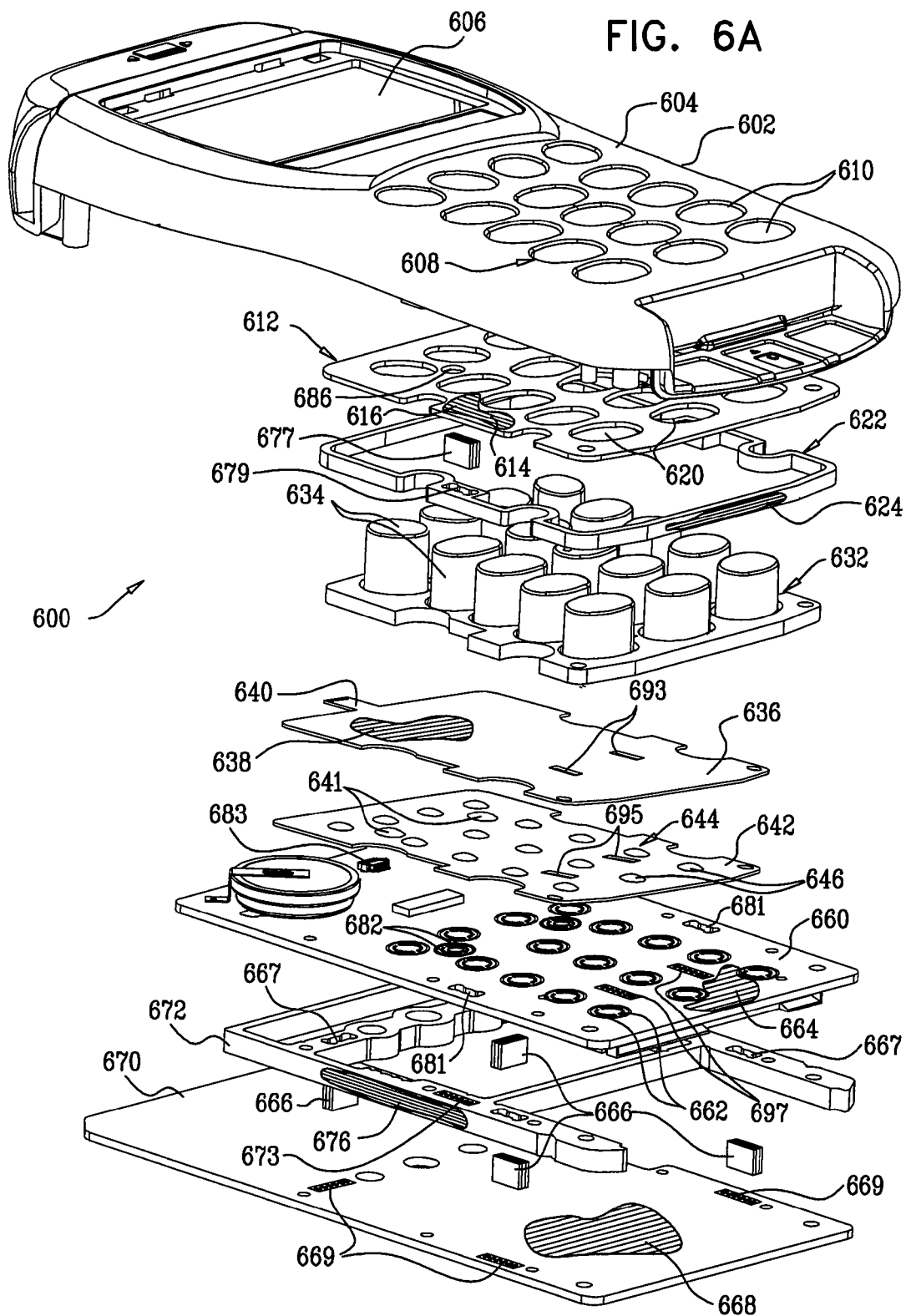
FIGS. 6A and 6B are simplified exploded view illustrations, taken in respective opposite directions, of a secure keypad device constructed and operative in accordance with yet a further preferred embodiment of the present invention.
Figure 6B:
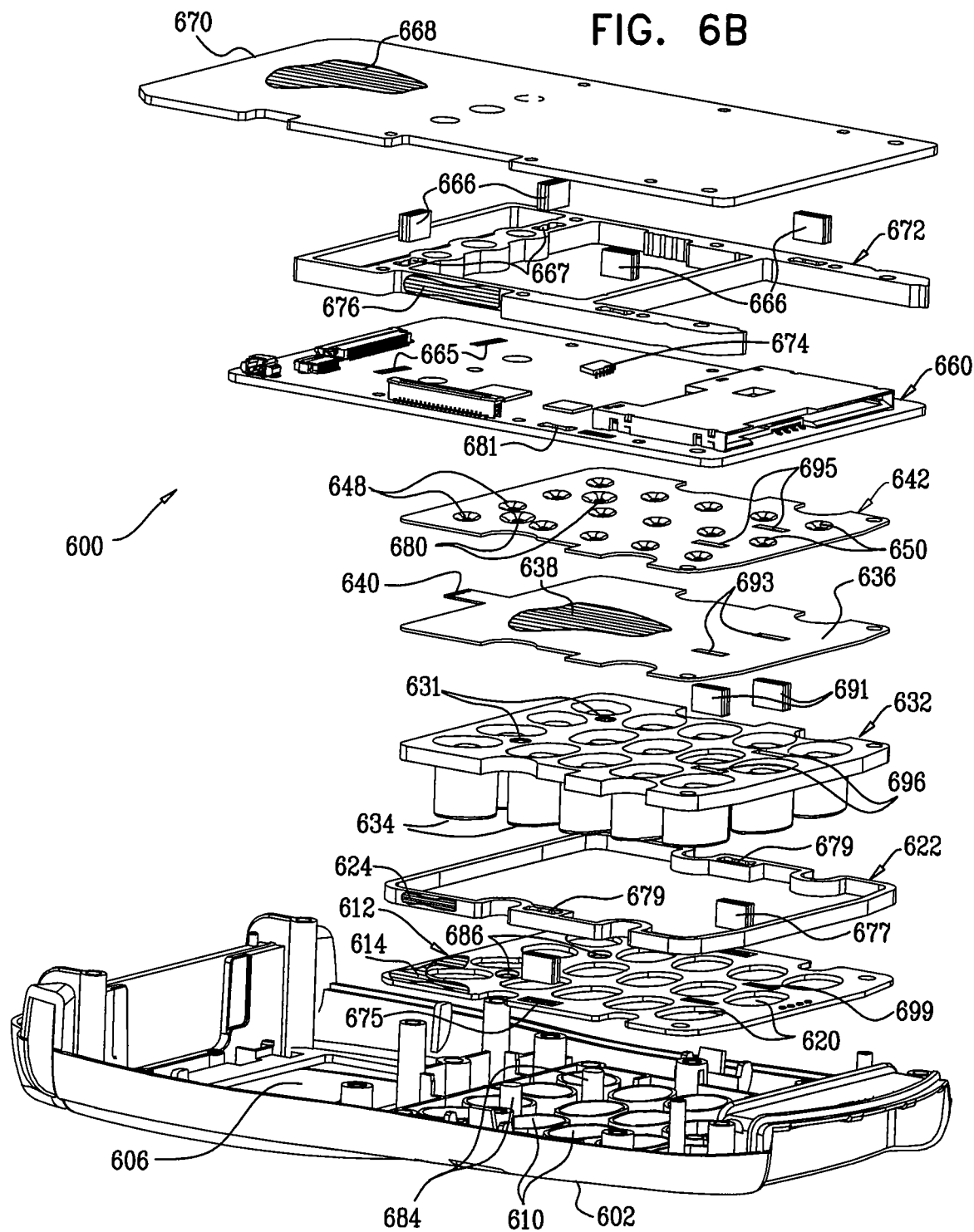
Figure 7:
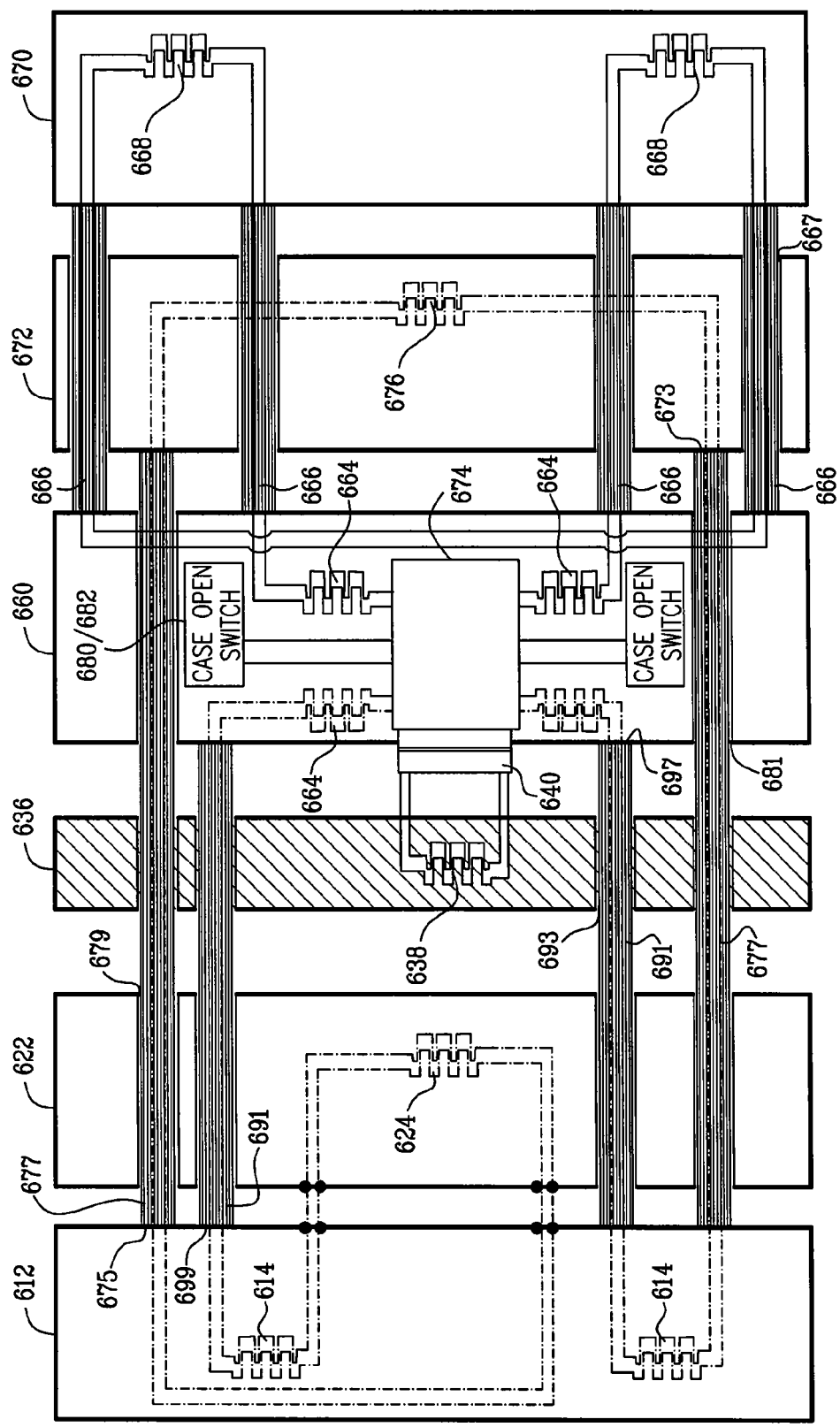
FIG. 7 is a simplified illustration of electrical connections between anti-tampering elements in the embodiments of FIGS. 6A and 6B.

Reference is now made FIGS. 6A and 6B, which are simplified exploded view illustrations, taken in respective opposite directions, of a secure keypad device constructed and operative in accordance with an additional preferred embodiment of the present invention, and to FIG. 7, which is a simplified illustration of electrical connections between anti-tampering elements in the embodiments of FIGS. 6A and 6B.

As seen in FIGS. 6A-7, there is provided a secure keypad device 600 including a housing element 602 which, together with a back panel (not shown), defines a keypad device housing. Housing element 602 includes, on a top surface 604 thereof, a display aperture 606, through which a display (not shown) may be viewed, and an array 608 of key apertures 610.

An anti-tamper board 612, which includes an anti-tampering grid 614 formed of a multiplicity of interconnected anti-tampering electrical conductors 616, underlies top surface 604 and is provided with key apertures 620 in registration with key apertures 610. Fixedly and electrically coupled to anti-tamper board 612 is a peripheral anti-tamper keypad enclosure 622, which preferably includes an anti-tampering grid 624 formed of a multiplicity of interconnected anti-tampering electrical conductors.

A key mat 632, preferably formed of a resilient plastic or rubber, defines a plurality of depressible keys 634 which partially extend through key apertures 610 and 620. A flexible resilient protective element 636, preferably a resilient generally planar pad formed of flexible and resilient plastic or rubber which includes an anti-tampering grid 638 formed of a multiplicity of interconnected anti-tampering electrical conductors, is provided. An electrical cable 640 is coupled to grid 638.

Disposed below element 636 is a key contact pad 642, preferably a resilient generally planar pad formed of flexible and resilient plastic or rubber, having an array 644 of raised resilient domes 646 having conductors 648 formed on corresponding bottom facing surfaces 650 thereof.

An electrical circuit board 660 is disposed in predetermined spaced relationship with key mat 632 and defines a plurality of pairs of adjacent electrical contact pads 662, each pair underlying a corresponding conductor 648. The arrangement of key mat 632 and of electrical circuit board 660 is such that depression of a key 634 by the finger of a user causes conductor 648 to establish electrical contact with and between a corresponding pair of electrical contact pads 662 lying thereunder and in registration therewith. When key 634 is not depressed, no electrical contact exists between conductor 648 and a pair of corresponding pads 662 or between the adjacent pads of the pair.

Circuit board 660 preferably includes an anti-tampering grid 664, formed of a multiplicity of interconnected anti-tampering electrical conductors. Fixedly and electrically coupled to board 660 and to an additional electrical circuit board 670 is a peripheral anti-tamper enclosure 672, which preferably includes an anti-tampering grid 676 formed of a multiplicity of interconnected anti-tampering electrical conductors.

Electrical connectors 666, which extend through apertures 667 in peripheral anti-tamper enclosure 672, are coupled via contacts 665 to grid 664 and arranged for mating connection through contacts 669 with an anti-tampering grid 668 formed of a multiplicity of interconnected anti-tampering electrical conductors on additional electrical circuit board 670.

Electrical connectors 677 extend through apertures 679 formed in peripheral anti-tamper keypad enclosure 622 and through apertures 681 formed in board 660, each underlying corresponding aperture 679. Electrical connectors 677 are coupled via contacts 673 to anti-tampering grid 676 and arranged for mating connection through contacts 675 with anti-tampering grid 614.

Flexible electrical cable 640 is connected to a connector 683 on electrical circuit board 660.

Electrical connectors 691 extend through apertures 693 formed in flexible element 636 and through apertures 695 formed in key contact pad 642 and corresponding apertures 696 formed in key mat 632. Electrical connectors 691 are coupled via contacts 697 to anti-tampering grid 664 and arranged for mating connection through contacts 699 with an anti-tampering grid 614.

Anti-tampering grid 624 is soldered to anti-tampering grid 614.

It is thus appreciated that the anti tampering grids 614, 664, 668, 638, 624 and 676, on boards 612, 660 and 670, element 636 and enclosures 622 and 672, respectively, are interconnected so as to define an anti-tampering enclosure, which is coupled to and physically encloses anti-tampering detection circuitry 674.

In accordance with a preferred embodiment of the present invention, case-open switches, which sense physical tampering and opening of the housing, are also located within the anti-tampering enclosure. In the illustrated embodiment the case-open switches are each embodied in conductors 680 mounted on the bottom facing of domes 641 of key contact pad 642 and corresponding pairs of electrical contact pads 682 mounted on board 660. When the housing is closed, pins 684, which extend through apertures 686 in board 612, urge elements 631 on key mat 632 towards element 636 and key contact pad 642 and urge domes 641 on key contact pad 642 towards board 660 and thus force conductors 680 and pair of electrical contact pads 682 into electrical contact. When the housing is opened, pins 684 no longer force conductors 680 and pair of electrical contact pads 682 into electrical contact and as a result electrical contact no longer exists between conductors 680 and pair of electrical contact pads 682 and a suitable alarm or disablement occurs.

Reference is now made to FIG. 8, which is a simplified exploded view illustration of a secure keypad device constructed and operative in accordance with a still further preferred embodiment of the present invention, and to FIGS. 9A & 9B, which are simplified sectional illustrations of part of the device of FIG. 8, taken along lines IX-IX in FIG. 8, in respective key non-depressed and key depressed operative orientations.

As seen in FIGS. 8-9B, there is provided a secure keypad device 800 including a housing element 802 which, together with a back panel (not shown), defines a keypad device housing. Housing element 802 includes, on a top surface 804 thereof, a display aperture 806, through which a display (not shown) may be viewed, and an array 808 of key apertures 810.

An anti-tamper board 812, which includes an anti-tampering grid 814 formed of a multiplicity of interconnected anti-tampering electrical conductors, underlies top surface 804 and is provided with key apertures 820 in registration with key apertures 810. Fixedly and electrically coupled to anti-tamper board 812 is a peripheral anti-tamper keypad enclosure 822, which preferably includes an anti-tampering grid 824 formed of a multiplicity of interconnected anti-tampering electrical conductors.

A key mat 832, preferably formed of a resilient plastic or rubber, defines a plurality of depressible keys 834 which partially extend through key apertures 810 and 820. Conductors 836 are formed on key mat 832.

Pairs of adjacent electrical contact pads 838 are located on board 812 in registration with conductors 836 and are arranged such that when keys 834 are in a non-depressed operative orientation, such as that shown in FIG. 9A, electrical contact exists between conductors 836 and pairs of adjacent electrical contact pads 838 lying thereover and in registration therewith and between those pairs of adjacent electrical contact pads 838. When keys 834 are in a depressed operative orientation, such as that shown in FIG. 9B, no electrical contact exists between conductors 836 and pairs of adjacent electrical contact pads 838 lying thereover and in registration therewith and between those pairs of adjacent electrical contact pads 838.

An electrical circuit board 840 is disposed in predetermined spaced relationship with key mat 832. Board 840 preferably includes an anti-tampering grid 844 formed of a multiplicity of interconnected anti-tampering electrical conductors. Electrical connectors 846 are coupled to grid 844 and arranged for mating connection with an anti-tampering grid 854, formed of a multiplicity of interconnected anti-tampering electrical conductors, which is formed on an additional electrical circuit board 856. Fixedly and electrically coupled to boards 840 and 856 is a peripheral anti-tamper enclosure 858 which preferably includes an anti-tampering grid 859, formed of a multiplicity of interconnected anti-tampering electrical conductors. It is thus appreciated that the anti tampering grids 844, 854 and 859, on boards 840 and 856 and peripheral anti-tamper enclosure 858, respectively, are interconnected so as to define an anti-tampering enclosure, which is coupled to and physically encloses anti-tampering detection circuitry (not shown). It is also appreciated that anti tampering grids 814 and 824 on board 812 and enclosure 822 are coupled to anti-tampering circuitry (not shown) and preferably interconnected to anti tampering grids 844, 854 and 859 on boards 840 and 856 and enclosure 858.

In accordance with a preferred embodiment of the present invention, case-open switches, which sense physical tampering and opening of the housing, are also located within the anti-tampering enclosure. In the illustrated embodiment, the case-open switches are each embodied in conductors (not shown) mounted on key mat 832 and formed on underside surface thereof, and corresponding pair of electrical pads 864 mounted on board 840. When the housing is closed, pins (not shown) extend through apertures (not shown) in board 812 and force pair of electrical contacts 864 and corresponding conductors on key mat 832 into electrical contact. When the housing is opened, pins 864 no longer force conductors on key mat 832 and pair of electrical pads 864 into electrical contact and as a result electrical contact no longer exists between conductors on key mat 832 and pair of electrical contacts 864 and a suitable alarm or disablement occurs.

Reference is now made to FIG. 10, which is a simplified exploded view illustration of a secure keypad device constructed and operative in accordance with a yet further preferred embodiment of the present invention, and to FIGS. 11A & 11B, which are simplified sectional illustrations of part of the device of FIG. 10, taken along lines XI-XI in FIG. 10, in respective key non-depressed and key depressed operative orientations.

As seen in FIGS. 10-11B, there is provided a secure keypad device 900 including a housing element 902 which, together with a back panel (not shown), defines a keypad device housing. Housing element 902 includes a display aperture 906, through which a display (not shown) may be viewed, and an array 908 of key apertures 910.

An anti-tamper board 912, which includes an anti-tampering grid 914 formed of a multiplicity of interconnected anti-tampering electrical conductors, underlies top surface of housing element 902 and is provided with key apertures 920 in registration with key apertures 910. Fixedly and electrically coupled to anti-tamper board 912 is a peripheral anti-tamper keypad enclosure 922, which preferably includes an anti-tampering grid 923, formed of a multiplicity of interconnected anti-tampering electrical conductors.

A key mat 932, preferably formed of a resilient plastic or rubber, defines a plurality of depressible keys 934 which partially extend through key apertures 910 and 920. Conductors 936 are formed on an underside surface 938 of key mat 932, preferably on opposite sides of each of keys 934.

An electrical circuit board 940, which functions, inter alia, as a key contact board, is disposed in predetermined spaced relationship with key mat 932 and defines a plurality of pairs of adjacent electrical contact pads 942, each pair underlying a corresponding conductor 936.

When keys 934 are in a non-depressed operative orientation, such as that shown in FIG. 11A, electrical contact does not exist between conductors 936 and pairs of adjacent electrical contact pads 942 lying thereunder and in registration therewith and between those pairs of adjacent electrical contact pads 942. When keys 934 are in a depressed operative orientation, such as that shown in FIG. 11B, electrical contact exists between conductors 936 and pairs of adjacent electrical contact pads 942 lying thereunder in registration therewith and between those pairs of adjacent electrical contact pads 942.

Board 940 preferably includes an anti-tampering grid 944, formed of a multiplicity of interconnected anti-tampering electrical conductors. Electrical connectors 946 are coupled to grid 944 and arranged for mating connection with an anti-tampering grid 954, formed of a multiplicity of interconnected anti-tampering electrical conductors, which is formed on an additional electrical circuit board 956. Fixedly and electrically coupled to boards 940 and 956 is a peripheral anti-tamper enclosure 958 which preferably includes an anti-tampering grid 957 formed of a multiplicity of interconnected anti-tampering electrical conductors. It is appreciated that the anti tampering grids 944, 954 and 957 on boards 940 and 956 and peripheral anti-tamper enclosure 958, respectively, are interconnected so as to define an anti-tampering enclosure, which is coupled to and physically encloses anti-tampering detection circuitry 959. Electrical connectors 980 and 982 preferably couple grids 914 and 923 on board 912 and enclosure 922, respectively, to anti-tampering detection circuitry 959.

In accordance with a preferred embodiment of the present invention, case-open switches, which sense physical tampering and opening of the housing are also located within the anti-tampering enclosure. In the illustrated embodiment the case-open switches are each embodied in conductors 962 mounted on key mat 932 and corresponding conductors (not shown) mounted on board 940. When the housing is closed, pins 966 extend through apertures 968 in board 912 and force conductors 962 into electrical contact with the corresponding conductors on board 940. When the housing is opened, pins 966 no longer force conductors 962 into electrical contact with the corresponding conductors on board 940 and as a result electrical contact no longer exists between conductors 962 and the corresponding conductors on board 940 and a suitable alarm or disablement occurs.

Figure 12B:
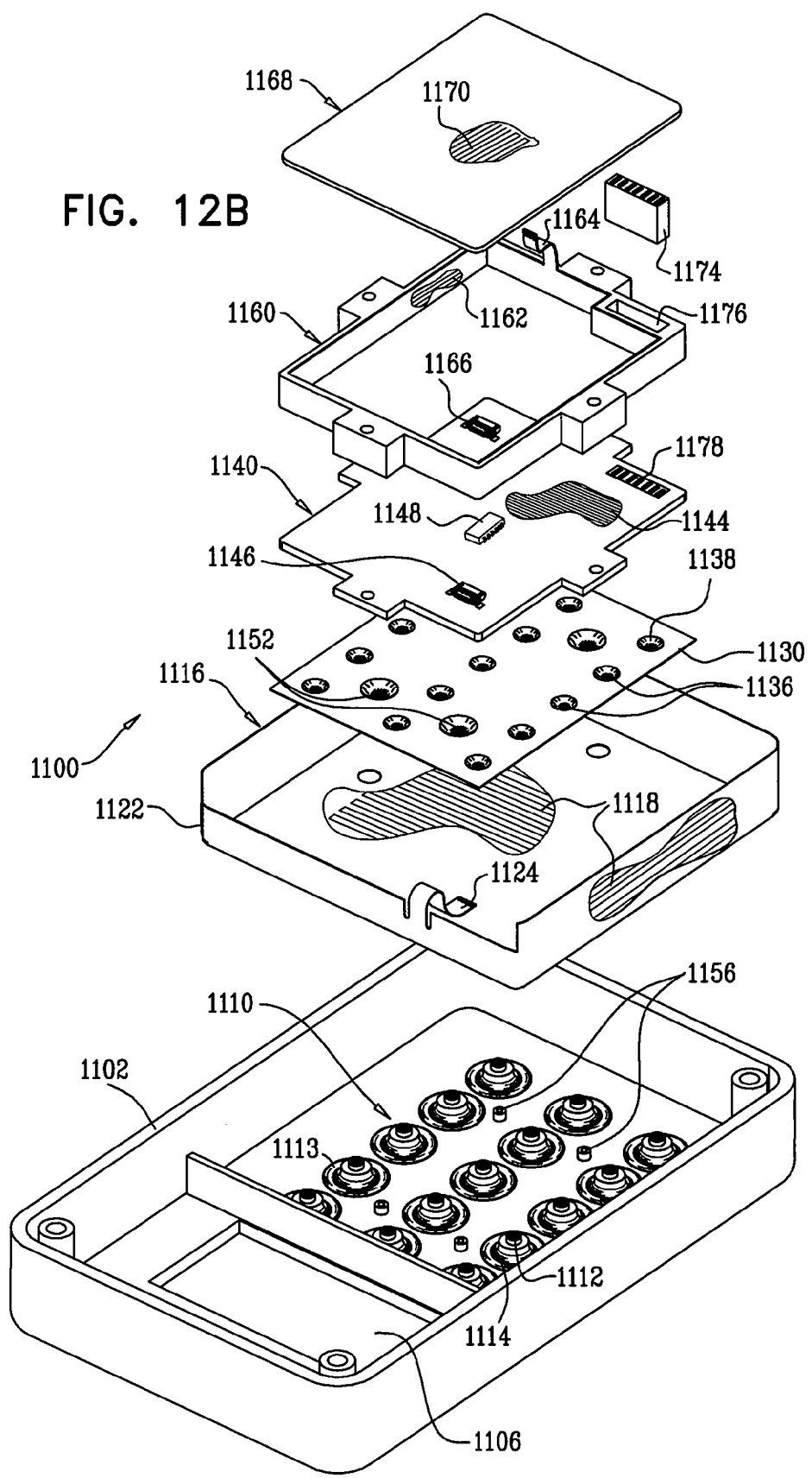

Reference is now made to FIGS. 12A and 12B, which are simplified exploded view illustrations, taken in respective opposite directions, of a secure keypad device constructed and operative in accordance with still another preferred embodiment of the present invention.

As seen in FIGS. 12A and 12B, there is provided a secure keypad device 1100 including a housing element 1102 which, together with a back panel (not shown), defines a keypad device housing. Housing element 1102 includes, on a top surface 1104 thereof, a display aperture 1106, through which a display (not shown) may be viewed, and an array 1108 of depressible keys 1110, preferably integrally formed with housing element 1102.

Keys 1110 are preferably formed of a resilient plastic or rubber and partially extend above top surface 1104 of housing element 1102. As seen particularly in section A-A enlargement in FIG. 12A, a contact surface 1112 of each of keys 1110 extends below top surface 1104 of housing element 1102. Keys 1110 preferably include an attachment portion 1113 and a connection portion 1114.

A flexible resilient protective partial enclosure 1116, which includes an anti-tampering grid 1118, formed of a multiplicity of interconnected anti-tampering electrical conductors, on a top surface 1120 thereof and on side surfaces 1122 thereof, is provided. A flexible cable 1124 is coupled to grid 1118.

Disposed within protective partial enclosure 1116, underlying top surface 1120, is a key contact pad 1130. Key contact pad 1130 is preferably a resilient, generally planar, pad formed of flexible and resilient plastic or rubber, having an array 1132 of raised resilient domes 1134 with conductors 1136 being formed on corresponding bottom facing surfaces 1138 thereof.

Disposed in predetermined spaced relationship with key contact pad 1130 is an electrical circuit board 1140, which functions, inter alia, as a key contact board, defining a plurality of pairs of adjacent electrical contact pads 1142, each pair underlying a corresponding conductor 1136, preferably made of carbon, metal or combination of carbon/metal. The arrangement of key contact pad 1130 and of electrical circuit board 1140 is such that depression of a key 1110 by the finger of a user causes conductor 1136 to establish electrical contact with and between a corresponding pair of electrical contact pads 1142 lying thereunder and in registration therewith. When key 1110 is not depressed, no electrical contact exists between conductor 1136 and a pair of corresponding electrical contact pads 1142 or between the adjacent pads of the pair.

Electrical circuit board 1140 preferably includes an anti-tampering grid 1144 formed of a multiplicity of interconnected anti-tampering electrical conductors. An electrical connector 1146 is arranged for mating connection with flexible cable 1124. The anti-tampering grids 1118 and 1144 are coupled to anti-tampering detection circuitry 1148.

In accordance with a preferred embodiment of the present invention, case-open switches, which sense physical tampering and opening of the housing, are also located within partial enclosure 1116. In the illustrated embodiment, the case-open switches are each embodied in a raised resilient dome 1150 formed on key contact pad 1130 and have conductors 1152 formed on an underside surface thereof. Domes 1150 preferably extend outwardly from the surface of key contact pad 1130 to a greater extent than do domes 1134.

Disposed on electrical circuit board 1140 underlying each of domes 1150 are a corresponding number of pairs of adjacent electrical contact pads 1154, each pair underlying a corresponding conductor 1152. The arrangement of key contact pad 1130 and of electrical circuit board 1140 is such that as long as the housing is closed, conductors 1152 each are in electrical contact with and between a corresponding pair of electrical contact pads 1154 lying thereunder and in registration therewith. This electrical contact is ensured by the provision of pins 1156 integrally formed on housing element 1102. When the housing is closed, pins 1156 urge corresponding domes 1150 on contact pad 1130, and thus corresponding conductors 1152, on the underside surfaces thereof, into electrical contact with corresponding electrical contact pads 1154.

When the housing is opened, no electrical contact exists between conductor 1152 and corresponding pairs of electrical contact pads 1154 or between the adjacent pads of the pair of electrical contact pads 1154 and a suitable alarm or disablement occurs.

Disposed below electrical circuit board 1140, there is provided a peripheral protective grid element 1160 which includes an anti-tampering grid 1162, preferably coupled to a flexible cable 1164, which is in turn connected to a connector 1166 on electrical circuit board 1140. Peripheral protective grid element 1160 preferably is located interiorly of the side surfaces 1122 of enclosure 1116. Fixedly attached to peripheral protective grid element 1160 and preferably disposed therebelow is a bottom protective grid element 1168 which includes an anti-tampering grid 1170, which is coupled via contacts 1172 and via a connector 1174 which extends through an aperture 1176 formed in peripheral grid element 1160 into electrical contact with contacts 1178 on electrical circuit board 1140. The anti-tampering grids 1162 and 1170 are coupled to anti-tampering detection circuitry 1148.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A data entry device comprising:
    a housing including a top housing portion including key apertures;
    a key mat defining a plurality of depressible keys which partially extend through said key apertures;
    a resilient protective partial enclosure, including an anti-tampering grid formed of a multiplicity of interconnected anti-tampering electrical conductors on a top surface thereof, said resilient protective partial enclosure being formed with apertures aligned with said key apertures for permitting placement of said plurality of depressible keys therethrough;
    a key contact pad, disposed within said resilient protective partial enclosure underlying said top surface, having an array of raised resilient domes with dome conductors being formed on corresponding bottom facing surfaces thereof;
    an anti-tampering detection circuitry; and
    an electrical circuit board disposed in predetermined spaced relationship with said key contact pad and defining a plurality of pairs of adjacent electrical contact pads, each pair of said plurality of pairs of adjacent electrical contact pads underlying a corresponding one of said dome conductors,
    said key contact pad and said electrical circuit board being mutually arranged such that depression of one of said plurality of depressible keys causes the corresponding one of said dome conductors to establish electrical contact with and between a corresponding pair of said adjacent electrical contact pads lying thereunder and in registration therewith;
    wherein a multiplicity of anti-tampering electrical conductors disposed below said adjacent electrical contact pads of said electrical circuit board are electrically connected to said anti-tampering detection circuitry; and
    wherein said anti-tampering electrical conductors of said resilient protective partial enclosure are electrically connected to said anti-tampering electrical conductors disposed below said adjacent electrical contact pads of said electrical circuit board.

2. A data entry device according to claim 1 and wherein said key contact pad is flexible.

3. A data entry device according to claim 1 and wherein said anti-tampering electrical conductors of said resilient protective partial enclosure are disposed peripherally of said key contact pad.

4. A data entry device comprising:
    a housing including a top housing portion including housing key apertures;
    an anti-tamper board, including an anti-tampering grid formed of a multiplicity of interconnected anti-tampering electrical conductors underlying said top housing portion and including anti-tamper board key apertures in registration with said housing key apertures;
    a key mat defining a plurality of depressible keys which partially extend through said housing key apertures and said anti-tamper board key apertures, said depressible keys having key conductors on bottom facing surfaces thereof;
    an anti-tampering detection circuitry; and
    an electrical circuit board disposed in predetermined spaced relationship with said key mat and defining a plurality of pairs of adjacent electrical contact pads, each pair of said plurality of pairs of adjacent electrical contact pads underlying a corresponding key conductor,
    said key mat and said electrical circuit board being mutually arranged such that depression of one of said depressible keys causes the corresponding key conductor to establish electrical contact with and between a corresponding pair of said adjacent electrical contact pads lying thereunder and in registration therewith;
    wherein said anti-tampering electrical conductors of said anti-tampering grid and a multiplicity of anti-tampering electrical conductors below said electrical circuit board are electrically connected to said anti-tampering detection circuitry; and
    wherein said anti-tampering electrical conductors of said anti-tampering grid are electrically connected to said anti-tampering electrical conductors below said electrical circuit board.

5. A data entry device comprising:
    a housing including a top housing portion including housing key apertures;
    an anti-tamper board, including an anti-tampering grid formed of a multiplicity of interconnected anti-tampering electrical conductors underlying said top housing portion and including anti-tamper board key apertures in registration with said housing key apertures;
    a key mat defining a plurality of depressible keys which partially extend through said housing key apertures and said anti-tamper board key apertures;
    a flexible resilient protective element, including an anti-tampering grid formed of a multiplicity of interconnected anti-tampering electrical conductors;
    an anti-tampering detection circuitry;
    a key contact pad below said flexible resilient protective element and having an array of raised resilient domes with dome conductors being formed on corresponding bottom facing surfaces thereof; and
    an electrical circuit board disposed in predetermined spaced relationship with said key contact pad and defining a plurality of pairs of adjacent electrical contact pads, each pair of said plurality of pairs of adjacent electrical contact pads underlying a corresponding dome conductor, said key contact pad and said electrical circuit board being mutually arranged such that depression of one of said depressible keys causes the corresponding dome conductor to establish electrical contact with and between a corresponding pair of said plurality of pairs of adjacent electrical contact pads lying thereunder and in registration therewith;

wherein said anti-tampering electrical conductors of said anti-tamper board and said anti-tampering electrical conductors of said flexible resilient protective element are electrically connected to said anti-tampering detection circuitry;

wherein said anti-tampering electrical conductors of said anti-tamper board are electrically connected to said anti-tampering electrical conductors of said flexible resilient protective element.

* * * * *